US008386180B2

(12) United States Patent
Davies

(10) Patent No.: US 8,386,180 B2
(45) Date of Patent: Feb. 26, 2013

(54) GEOPHYSICAL DATA PROCESSING SYSTEMS

(75) Inventor: Mark Davies, Cambridgeshire (GB)

(73) Assignee: ARKeX Limited, Cambridge (GB)

( * ) Notice: Subject to any disclaimer, the term of this patent is extended or adjusted under 35 U.S.C. 154(b) by 376 days.

(21) Appl. No.: 12/452,986

(22) PCT Filed: Jul. 24, 2008

(86) PCT No.: PCT/GB2008/002517
§ 371 (c)(1),
(2), (4) Date: Apr. 16, 2010

(87) PCT Pub. No.: WO2009/016348
PCT Pub. Date: Feb. 5, 2009

(65) Prior Publication Data
US 2010/0206557 A1   Aug. 19, 2010

(30) Foreign Application Priority Data

Aug. 2, 2007  (GB) .................................. 0715031.1

(51) Int. Cl.
*G06F 19/00* (2011.01)
(52) U.S. Cl. .. 702/5; 702/2; 702/6; 702/14; 166/250.03; 166/250.4; 166/250.01
(58) Field of Classification Search .................. 702/1, 2, 702/5, 8, 11, 13, 14, 16, 167, 6; 73/382 G; 166/245, 250.03, 252.4, 250.01; 703/2, 6
See application file for complete search history.

(56) References Cited

U.S. PATENT DOCUMENTS 4,068,160 A    1/1978  Hunt 5,673,191 A    9/1997  Chapin et al.
(Continued)

FOREIGN PATENT DOCUMENTS

GB           2 435 523 A       8/2007
(Continued)

OTHER PUBLICATIONS

Blakely, R.J., "Potential Theory in Gravity and Magnetic Applications", Cambridge University Press, 1995, p. 185.
(Continued)

*Primary Examiner* — Carol Tsai
(74) *Attorney, Agent, or Firm* — Foley & Lardner LLP

(57) ABSTRACT

We describe a method of processing geophysical data including at least measured potential field data from a potential field survey of a surveyed region of the earth to provide a three-dimensional representation of the underlying geology of said surveyed region, the method comprising: inputting terrain-corrected potential field data for said surveyed region, said potential field data comprising data for a range of spatial wavelengths, geological features at different depths in said surveyed region being associated with different wavelengths in said range of wavelengths; filtering said potential field data by spatial wavelength to generate a first plurality of filtered sets of potential field data, each relating to a respective wavelength or range of wavelengths, each targeting geological features at a different respective said depth; processing each said filtered set of potential field data, to identify a set of spatial features comprising one or both of line spatial features and point spatial features in each said filtered set of potential field data, and to generate a set of plot data for each said filtered set of potential field data, a said set of plot data representing said identified set of spatial features for a said depth targeted by said filtering; and combining said sets of plot data to generate three-dimensional map data providing a three-dimensional representation of said underlying geology of said surveyed region.

23 Claims, 39 Drawing Sheets

U.S. PATENT DOCUMENTS

| | | | |
|---|---|---|---|
| 6,125,698 A * | 10/2000 | Schweitzer et al. | 73/382 G |
| 6,152,226 A * | 11/2000 | Talwani et al. | 166/252.4 |
| 6,424,918 B1 * | 7/2002 | Jorgensen et al. | 702/6 |
| 6,467,543 B1 * | 10/2002 | Talwani et al. | 166/252.4 |
| 6,502,037 B1 * | 12/2002 | Jorgensen et al. | 702/14 |
| 6,675,097 B2 * | 1/2004 | Routh et al. | 702/2 |
| 6,804,608 B2 * | 10/2004 | Lee et al. | 702/5 |
| 6,937,960 B2 * | 8/2005 | Khanna et al. | 702/167 |
| 6,954,698 B2 * | 10/2005 | Tryggvason | 702/5 |
| 7,908,085 B2 * | 3/2011 | Truffert et al. | 702/5 |
| 7,987,186 B1 * | 7/2011 | Joshi | 707/736 |
| 2003/0060981 A1 * | 3/2003 | Routh et al. | 702/14 |
| 2004/0260471 A1 * | 12/2004 | McDermott | 702/2 |
| 2006/0036367 A1 * | 2/2006 | Brewster | 702/14 |
| 2009/0252372 A1 * | 10/2009 | Davies | 382/100 |
| 2009/0287464 A1 * | 11/2009 | Barnes | 703/2 |
| 2010/0094556 A1 * | 4/2010 | Barnes et al. | 702/5 |
| 2010/0292973 A1 * | 11/2010 | Barnes et al. | 703/6 |
| 2012/0101789 A1 * | 4/2012 | Barnes | 703/2 |

FOREIGN PATENT DOCUMENTS

| | | |
|---|---|---|
| GB | 2 446 174 A | 8/2008 |
| GB | 2 447 699 A | 9/2008 |
| WO | WO 03/032015 A1 | 4/2003 |
| WO | WO 2007/012895 A2 | 2/2007 |

OTHER PUBLICATIONS

Childers, V., et al., "Airborne Gravimetry: An Investigation of Filtering", *Geophysics 64*: 61-69, Society of Exploration Geophysicists, 1997.

* cited by examiner

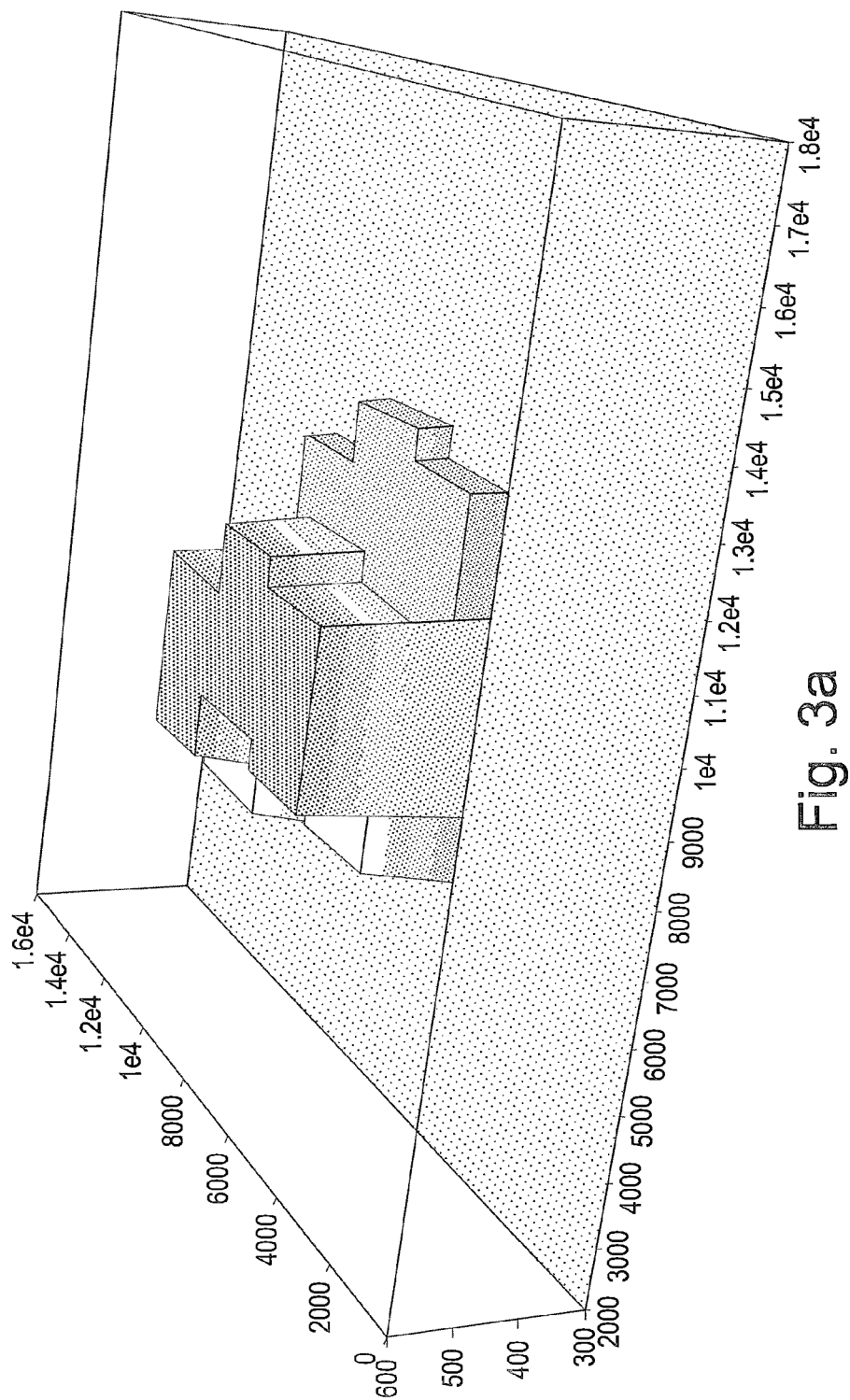

GEOPHYSICAL DATA PROCESSING SYSTEMS

This application is the National Phase of PCT/GB2008/002517, filed Jul. 24, 2008, which claims priority to Great Britain Application No. 0715031.1, filed Aug. 2, 2007, the disclosures of which are hereby incorporated by reference in their entirety.

FIELD OF THE INVENTION

This invention relates to methods, apparatus, and computer program code for processing geophysical data, more particularly potential field data from a potential field survey to provide a representation of the underlying geology of the surveyed region. Embodiments of the techniques we describe are particularly useful for processing data from airborne surveys, in particular gravity field surveys.

BACKGROUND TO THE INVENTION

In this specification we will refer to airborne surveys, and more particularly to gravity gradient surveys. However the techniques we describe are not limited to these types of survey and may be applied to other potential field surveys including, but not limited to, gravity surveys, magnetic field surveys such as magnetotelluric surveys, electromagnetic surveys and the like.

A potential field survey is performed by measuring potential field data which, for a gravity survey, may comprise one or more of gravimeter data (measuring gravity field) or gravity gradiometer data (measuring gravity field gradient), vector magnetometer data, true magnetic gradiometer data, and other types of data well-known to those skilled in the art. A common aim of a geophysical potential field survey is to search for signatures which potentially indicate valuable mineral deposits.

US2004/0260471 describes collecting scalar potential data measurements to prepare a surface representation. Analysis of the data is improved using traditional statistical techniques.

Flight Surveys

Conventionally airborne potential field surveys such as gravity surveys are flown on a grid pattern. The grid is defined by orthogonal sets of parallel lines (flight paths) on a two-dimensional surface which is draped over the underlying terrain. However the draped surface is constrained by the closest the aircraft is permitted to fly to the ground and the maximum rate of climb/descent of the aircraft. Some improved techniques for airborne potential field surveys, which facilitate the collection of data from close to the ground, are described in the applicant's co-pending PCT patent application "Gravity Survey Data Processing", PCT/GB2006/050211, published as WO2007/012895, hereby incorporated by reference in its entirety.

Data Conditioning

The term "levelling" is used in the art as a generic term to cover conventional techniques for data conditioning. These techniques include removal of low frequency drift, matching low frequency content of neighbouring lines, and referencing data to a fixed height place. For example the intersection points of a standard gridded survey can be used for cross-over levelling, where the data along survey lines are adjusted to minimise differences at these points. We have described some improved techniques for handling of noise in our UK patent application no. 0701725.4 filed on 30 Jan. 2007, hereby incorporated by reference in its entirety.

Terrain Correction

After the potential field data has been collected but prior to interpreting the data a terrain correction is generally applied, compensating for surface height variations. Surface data may be purchased in the form of digital terrain elevation data or determined from (D)GPS ((Differential) Global Position System) and/or airborne techniques such as LIDAR (Laser Imaging Detection and Ranging) and SAR (synthetic aperture radar). Aircraft acceleration, attitude, angular rate and angular acceleration data may also be used to correct the output data of the potential field instrumentation. We describe some improved techniques for terrain correction in geophysical surveys in our co-pending UK patent application "Terrain Correction Systems", no. 0601482.3, filed 25 Jan. 2006, published as GB2435523, also hereby incorporated by reference in its entirety. Another technique, described in WO 03/032015, corrects measurements from geophysical instruments in real time at source from other navigation and mapping instruments carried by the aircraft. A further particularly advantageous technique using time-domain correction data to provide terrain corrected measured potential field data for mapping of a field is described in our co-pending UK patent application no. 0705605.4 filed on 23 Mar. 2007, also hereby incorporated by reference in its entirety.

There remains a need, however, for improved techniques for processing geophysical data from such surveys in order to identify the underlying geology.

SUMMARY OF THE INVENTION

According to a first aspect of the invention there is therefore provided a method of processing geophysical data including at least measured potential field data from a potential field survey of a surveyed region of the earth to provide a three-dimensional representation of the underlying geology of said surveyed region, the method comprising: inputting terrain-corrected potential field data for said surveyed region, said potential field data comprising data for a range of spatial wavelengths, geological features at different depths in said surveyed region being associated with different wavelengths in said range of wavelengths; filtering said potential field data by spatial wavelength to generate a first plurality of filtered sets of potential field data, each relating to a respective wavelength or range of wavelengths, each targeting geological features at a different respective said depth; processing each said filtered set of potential field data, to identify a set of spatial features comprising one or both of line spatial features and point spatial features in each said filtered set of potential field data, and to generate a set of plot data for each said filtered set of potential field data, a said set of plot data representing said identified set of spatial features for a said depth targeted by said filtering; and combining said sets of plot data to generate three-dimensional map data providing a three-dimensional representation of said underlying geology of said surveyed region.

In some preferred embodiments of the method the potential field data comprises measured gravity and/or gravity gradient data, although other potential field data such as magnetic data may additionally or alternatively be employed and, similarly, other quantities derived from spatial derivatives of the potential field may additionally or alternatively be measured. In preferred embodiments the potential field survey is conducted from a moving platform such as an aircraft.

In embodiments, in particular where the field comprises a gravity field, the processing to identify spatial features comprises identifying one or more of maxima, minima and points/lines of inflection in the filtered potential field data. Thus, for example, with the gravity gradient tensor the on-diagonal components $G_{xx}$, $G_{yy}$, and $G_{zz}$ (which are differential signals) are processed to determine inflection points or changes in slope since these generally correspond to geologically significant features of the surveyed region such as an interface between two different types/densities of rock. For off-diagonal components, in particular $G_{zx}$ and $G_{zy}$ (which emphasise symmetries in the x- and y-direction respectively, maxima and/or minima are preferably identified; for $G_{xy}$ points are preferably identified by locating pairs of dipoles since these tend to identify corners of a subterranean body. Off-diagonal elements $G_{zi}$ (where i is x or y) tend to emphasise symmetries in the i-direction. On-diagonal components $G_{xx}$ and $G_{yy}$ are always zero along respective axis x=0 and y=0 and since the choice of axis is often arbitrary, optionally the co-ordinates system may can be rotated about one or more axis to potentially identify further geologically useful information. In embodiments the co-ordinate axis may be selected to maximise the apparent useful geological information. Similarly magnetic data may be processed to identify maximum/minimum inflection points/lines.

In embodiments of the method, although filtering by wavelength targets the filtered potential field data at a particular depth, nonetheless within the filtered potential field data different spatial features for example identified using the aforementioned processing, may be associated with different depths, either because of the physical shape of the subterranean feature, or because of a feature being associated with a more specific wavelength within the range, or both. In theory a buried object has a characteristic amplitude and wavelength at a given survey height, and this has a dependence on the shape of the object. Thus the precise depth associated with an underlying geological feature depends on the shape assumed for the feature. This may be provided by an approximate assumed model for the underlying geology since this information is usually available. Further the geometry of a fault or edge has a characteristic potential field signal, and this geometry may be assumed in processing the data set. In the case of a fault the filtered signal generally picks up the top of the fault (and so the edge of the fault can be tracked downwards by increasing the wavelength of the filter.

Thus in embodiments although a set of plot data comprising the identified spatial features has an associated targeted depth or depth range for the features, a feature will, in embodiments, also have an associated (more specific) depth. Thus the three-dimensional map, in embodiments, does not merely comprise a stack of flat maps but comprises a layered representation, spatial features within a layer having their own respective associated depths, for example assigned to a feature by wavelength and/or geometry. Embodiments of the technique may include inputting data for an assumed model for the underlying geology of the surveyed region, and this data may then be employed in determining the plot data for a set of spatial features, more particularly for determining estimated depths of spatial features identified from a filtered set of potential field data. The skilled person will understand that the plot data is used for generating a 3D plot map of the underlying geology but need not itself be plotted or otherwise output as an intermediate step (although it may be helpful). In general, however, the 3D map data will be output as a plot on a display or printer.

In general there will be a number of different sources of noise and uncertainty associated with the identified spatial features and thus, in some preferred embodiments of the method, "error bars" are added by dilating the representations of the spatial features, for example approximately in proportion to an estimated error. This dilation may also take account of the inherent lack of resolution resulting from the chosen spacing of the flight paths for the survey.

Referring again to the above-mentioned maxima, minima and lines of inflection, in some preferred embodiments of the method multiple sets of spatial features are identified for each wavelength-filtered set of potential field data, for example from different vector or tensor components of a surveyed gravity field, magnetic field or gravity gradient field and/or from survey data other than from a potential field survey. This other survey data need not be targeted at specific depths. Then, in embodiments, the method further comprises determining a degree of correlation between the multiple sets of spatial features, to identify a degree of coherency between the spatial features. For example in a simple implementation a degree of correlation may be measured by determining a degree of overlap when the spatial features are superposed. These multiple, correlated spatial features, in embodiments, significantly enhance the value of the geological information.

In preferred embodiments the degree of correlation is represented in both the plot data from multiple correlated sets of spatial features and in the three-dimensional representation of the underlying geology either explicitly, by providing correlation value information for identified spatial features and/or implicitly for example by omitting features with less than a threshold level of correlation. When displayed the degree of correlation may be indicated by colour, for example using warm colours for a high degree of correlation or coherency, and cold colours for a lower degree of correlation or coherency; brightness (high for high-correlation) may additionally or alternatively be employed. In some particularly preferred embodiments multiple sets of spatial features are generated from the filtered sets of potential field data, thus providing multiple sets of spatial features each targeted at substantially the same depth. As previously mentioned, these may be derived from different vector or tensor components of the surveyed potential field. When combined, this provides particularly useful geophysical/stratigraphic information. Other survey data which may be combined with the data obtained from a potential field survey includes (but is not limited to): topographic information, for example determined by lidar, spectral or more preferably hyperspectral imagery, gas saturation data, chemical analysis data (from soil sampling), and other soil survey data.

In some particularly preferred embodiments the method further comprises generating fault polygon data from the 3D representation of the underlying geology of the surveyed region. As the skilled person will understand, fault polygon data comprises data representing a location of one or more geological faults on a surface or horizon of the surveyed region. Such a fault polygon may be defined by a plurality of corner points and/or edges, in particular defining a loop, for example on the earth's surface. Such a fault polygon may thus define horizons of stratigraphic layers. Fault polygons are useful because it is generally undesirable to drill at the location of a fault because typically the geology changes to either side of a fault and thus by drilling through the fault one may miss the desired oil or mineral.

We have described above how multiple sets of spatial features may be combined and the degree of correlation between these determined. This technique itself provides useful geological information, which may be provided as what the inventors have termed a "ribbon coherency plot".

Thus in a related aspect the invention provides a method of processing geophysical data including at least measured potential field data from a potential field survey of a surveyed region of the earth to provide a representation of the underlying geology of the surveyed region as a set of lines, the method comprising: inputting potential field data for said surveyed region; processing said potential field data to identify spatial features comprising one or both of line spatial features and point spatial features, said spatial features corresponding to locations of changes in said underlying geology; determining a degree of correlation between said identified spatial features; and generating plot data providing a representation of said degree of correlation on a set of lines representing said line spatial features to identify said locations of said changes to thereby represent said underlying geology of said surveyed region.

Features of embodiments of the above-described first aspect of the invention may similarly be employed when generating a "ribbon coherency plot".

The generation of one or more sets of ribbon coherency plots and the generation of a three-dimensional representation of the underlying geology of a surveyed region from such plots may be performed in separate steps.

Thus in a further related aspect the invention provides a method of processing geophysical data including at least measured potential field data from a potential field survey of a surveyed region of the earth to provide a three-dimensional representation of the underlying geology of said surveyed region, the method comprising: inputting geological spatial feature data derived from filtered potential field data, said filtered potential field data comprising data filtered by spatial wavelength to generate a plurality of filtered sets of potential field data each targeting geological features at a different respective depth in said surveyed region, said spatial feature data comprising data identifying a set of spatial features for each said targeted depth, a said set of spatial features comprising one or both of line spatial features and point spatial features; and combining said sets of spatial features for each said targeted depth to generate three-dimensional map data providing a three-dimensional representation of said underlying geology of said surveyed region.

The invention also provides a method of extracting oil or a mineral from the earth, the method including conducting a potential field survey according to an aspect or embodiment of the invention as described above to generate a representation of the underlying geology of the surveyed region, and then using this representation to extract the desired oil or mineral. A further aspect of the invention also provides oil or mineral extracted using this technique.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another, for example distributed across a network.

The invention further provides a data processing system configured to implement embodiments of the above-described methods, to determine one or more parameters relating to physical properties of the Earth's interior from processed geophysical data. Such a data processing system may comprise: data memory for storing measured potential field data and plot data for representing the underlying geology of the surveyed region, program memory storing processor control code as described above; and a processor coupled to said data memory and to said program memory to load and implement said control code.

BRIEF DESCRIPTION OF THE DRAWINGS

These and other aspects of the invention will now be further described, by way of example only, with reference to the accompanying figures in which:

FIGS. 3a to 3d show, respectively, first and second perspective views, a vertical cross-sectional view, and boundaries and offsets of a model of a faulted subterranean body;

DETAILED DESCRIPTION OF PREFERRED EMBODIMENTS

Potential Field Surveys

Figure 1A:
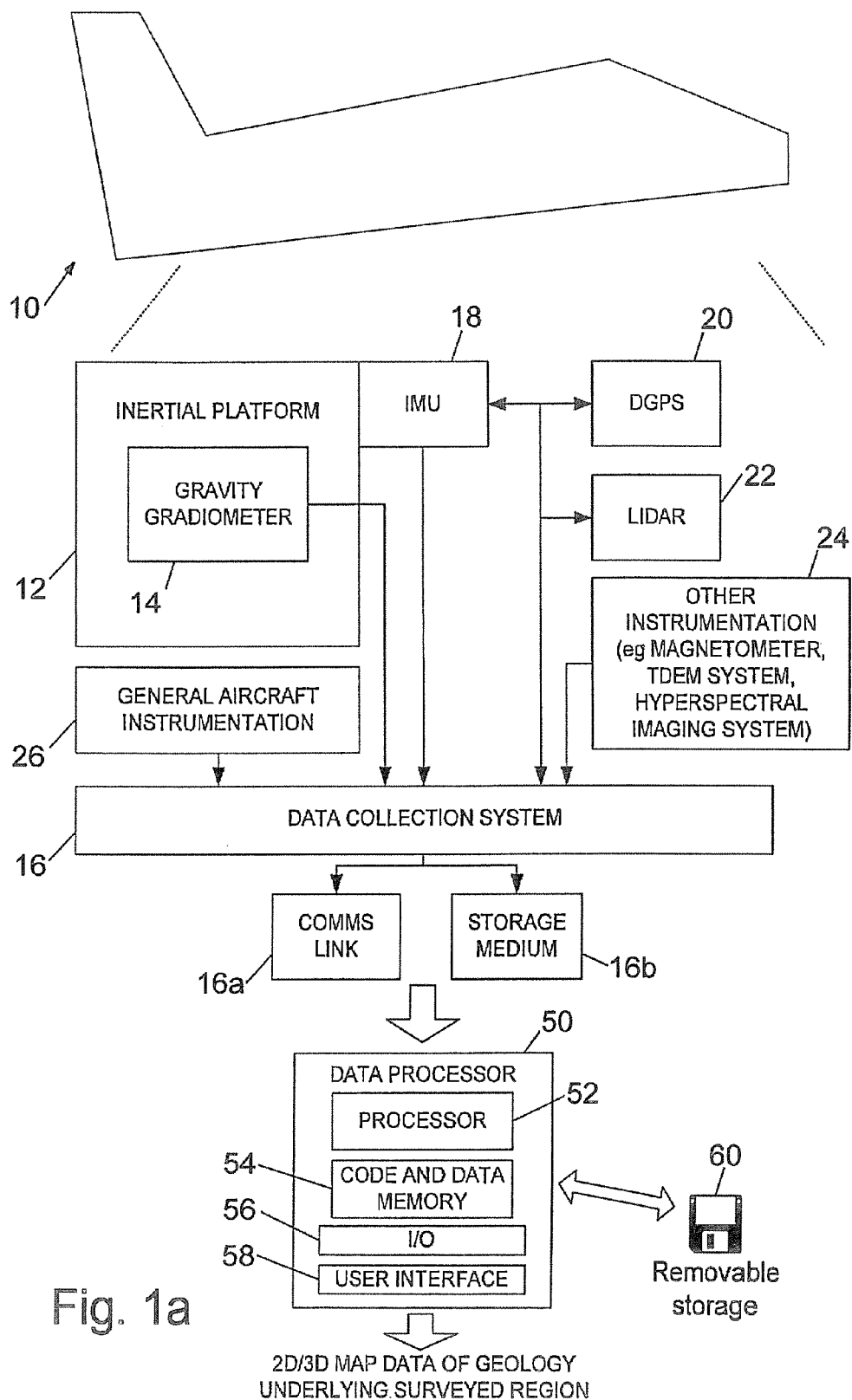
FIGS. 1a and 1b show, respectively, an aircraft with flight survey data, and an example of a data processing system configured to implement an embodiment of a method according to the invention, and an example set of flight paths for an airborne potential field survey.

When we refer to a field, in particular a gravity field, this is not limited to a vector field but includes scalar and tensor fields, a potential field and any derivatives deriving from the potential field. Potential field data includes, but is not limited to, gravimeter data, gravity gradiometer data, vector magnetometer data and true magnetic gradiometer data. Elements and representations of a potential field may be derived from a scalar quantity.

Consider an airborne potential field survey such as a gravity survey, flown on a grid pattern defined by orthogonal sets of parallel lines (flight paths) on a two-dimensional surface which is draped over the underlying terrain. When looking for underlying anomalies the nearby mass has a dominating effect and to provide an accurate representation of deep features a good representation of surface features is desirable so as to be able to perform terrain correction (as described above) by subtracting-off particularly the higher frequencies (which dominate the power spectrum). A signal with wavelength $\lambda$ falls off with height z as $\exp(-kz)$ where $k=2\pi/\lambda$ (from which it can be seen that longer wavelengths are less attenuated) and the wavelength scale corresponds to a signature expected given a target's size and depth.

For gravity, the relevant potential is the gravity scalar potential, $\Phi(r)$, defined as $$\Phi(r) = \int\int\int \frac{G\rho(r')}{|r-r'|} d^3r'$$

where r, $\rho(r')$, G are respectively, the position of measurement of the gravity field, the mass density at location r', and the gravitational constant. The gravitational acceleration, which is how a gravitational field is experienced, is the spatial derivative of the scalar potential. Gravity is a vector in that it has directionality. It is represented by three components with respect to any chosen Cartesian coordinate system as:

$$g = (g_x, g_y, g_z) = \left(\frac{\partial \Phi(r)}{\partial x}, \frac{\partial \Phi(r)}{\partial y}, \frac{\partial \Phi(r)}{\partial z}\right)$$

Each of these three components varies in each of the three directions and the nine quantities so generated form the Gravity gradient tensor:

$$G = \begin{pmatrix} G_{xx} & G_{xy} & G_{xz} \\ G_{yx} & G_{yy} & G_{yz} \\ G_{zx} & G_{zy} & G_{zz} \end{pmatrix} = \begin{pmatrix} \frac{\partial}{\partial x}\frac{\partial \Phi(r)}{\partial x} & \frac{\partial}{\partial x}\frac{\partial \Phi(r)}{\partial y} & \frac{\partial}{\partial x}\frac{\partial \Phi(r)}{\partial z} \\ \frac{\partial}{\partial y}\frac{\partial \Phi(r)}{\partial x} & \frac{\partial}{\partial y}\frac{\partial \Phi(r)}{\partial y} & \frac{\partial}{\partial y}\frac{\partial \Phi(r)}{\partial z} \\ \frac{\partial}{\partial z}\frac{\partial \Phi(r)}{\partial x} & \frac{\partial}{\partial z}\frac{\partial \Phi(r)}{\partial y} & \frac{\partial}{\partial z}\frac{\partial \Phi(r)}{\partial z} \end{pmatrix}$$

There is a relationship between the depth (and shape) of a buried object and the wavelength (and amplitude) of the detected signal. In general, a measured quantity—say a component of the gravity vector or of the gravity gradient tensor will be a summation of the form shown below. Here we use gg as notation for the measured quantity, for example $G_{zz}$.

$$gg_{calculated}(r_{measure}) = \sum_{all-masses} m_{mass-element} F(r_{measure} - r_{mass-element})$$

In the above equation F is called a Greens function (see for example, R. J. Blakely, "Potential Theory in Gravity and Magnetic Applications", Cambridge University Press, 1995, at page 185, incorporated by reference) and $r_{mass-element}$ defines the location of the mass element (for example the centre of gravity or some other defined point).

The functions F are standard functions, essentially, the influence a source (mass element) of unity mass or density and defined shape would have at the relevant (measurement) point. The source may be a point source, sphere or ellipsoid but, in practice is more often a prism, which may be irregular. For example, if the presence of a particular geological layer or, say, geological anomaly, e.g. a kimberlite pipe, is suspected a shape can be defined to take account of this. A number of textbooks list Greens functions for simple shapes; functions for more complex source geometries can be found in the literature. Also the source influence superposes so that if a complex shape can be discretised into a plurality of simpler shapes then the Greens functions for the discrete shapes can be added together. This in principle allows numerical values for the Greens function of any arbitrary shape to be determined, although in practice relatively simple shapes are generally preferable. By way of example, the Green's function F for a rectangular prism (Blakely, ibid, at page 187), has 8 terms each of which corresponds to a vertex of the prism.

Referring now to FIG. 1, this shows an example of an aircraft 10 for conducting a potential field survey to obtain data for processing in accordance with a method as described above. The aircraft 10 comprises an inertial platform 12 on which is mounted a gravity gradiometer 14, for example a full-tensor gravity gradiometer from Lockheed-Martin. The gravity gradiometer 14 provides potential field survey data to a data collection system 16. A particularly advantageous design of superconducting gravity gradiometer ("Exploration Gravity Gradiometer"—EGG) is described in the Applicant's PCT application.

The inertial platform 12 is fitted with an inertial measurement unit (IMU) 18 which also provides data to data collection system 16 typically comprising attitude data (for example, pitch, roll and yaw data), angular rate and angular acceleration data, and aircraft acceleration data. The aircraft is also equipped with a differential GPS system 20 and a LIDAR system 22 or similar to provide data on the height of the aircraft above the underlying terrain. The aircraft 10 may also be equipped with other instrumentation 24 such as a magnetic gradiometer or magnetometer, TDEM system and/or hyperspectral imaging system, again feeding into the data collection system. The data collection system 16 also has an input from general aircraft instrumentation 26 which may comprise, for example, an altimeter, air and/or ground speed data and the like. The data collection system 16 may provide some initial data pre-processing, for example to correct the LIDAR data for aircraft motion and/or to combine data from the IMU 18 and DGPS 20. The data collection system 16 may be provided with a communications link 16a and/or non-volatile storage 16b to enable the collected potential field and position data to be stored for later processing. A network interface (not shown) may also be provided.

Figure 1B:
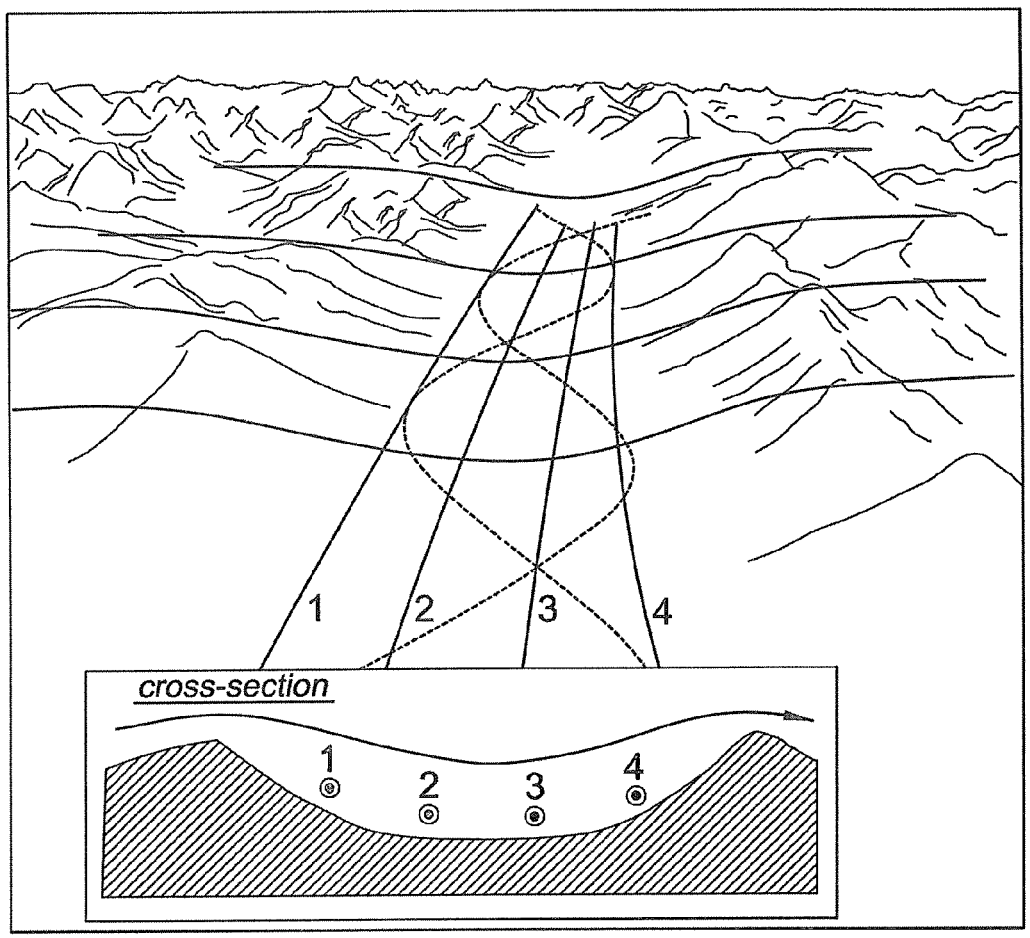

FIG. 1b shows examples of flight survey paths, data from which can be processed by the techniques we have previously described in "Gravity Survey Data Processing", PCT/GB2006/050211 (WO2007/012895).

Data processing to generate plot data from the potential field survey to provide a 3D representation of the underlying geology of the surveyed region is generally (but not necessarily) carried out offline, sometimes in a different country to that where the survey data was collected. As illustrated a data processing system 50 comprises a processor 52 coupled to code and data memory 54, an input/output system 56 (for example comprising interfaces for a network and/or storage media and/or other communications), and to a user interface 58 for example comprising a keyboard and/or mouse. The code and/or data stored in memory 54 may be provided on a removable storage medium 60. In operation the data includes data collected from the potential field survey and the code comprises code to process this data to generate 2D/3D geological map data in accordance with the procedure described below.

Potential Field Survey Data Processing

We now describe techniques for processing data from a potential field survey to extract a representation of the underlying geology. We first describe a technique for generating linear representations of the underlying geology, with reference to the procedure of FIG. 2.

Figure 2:
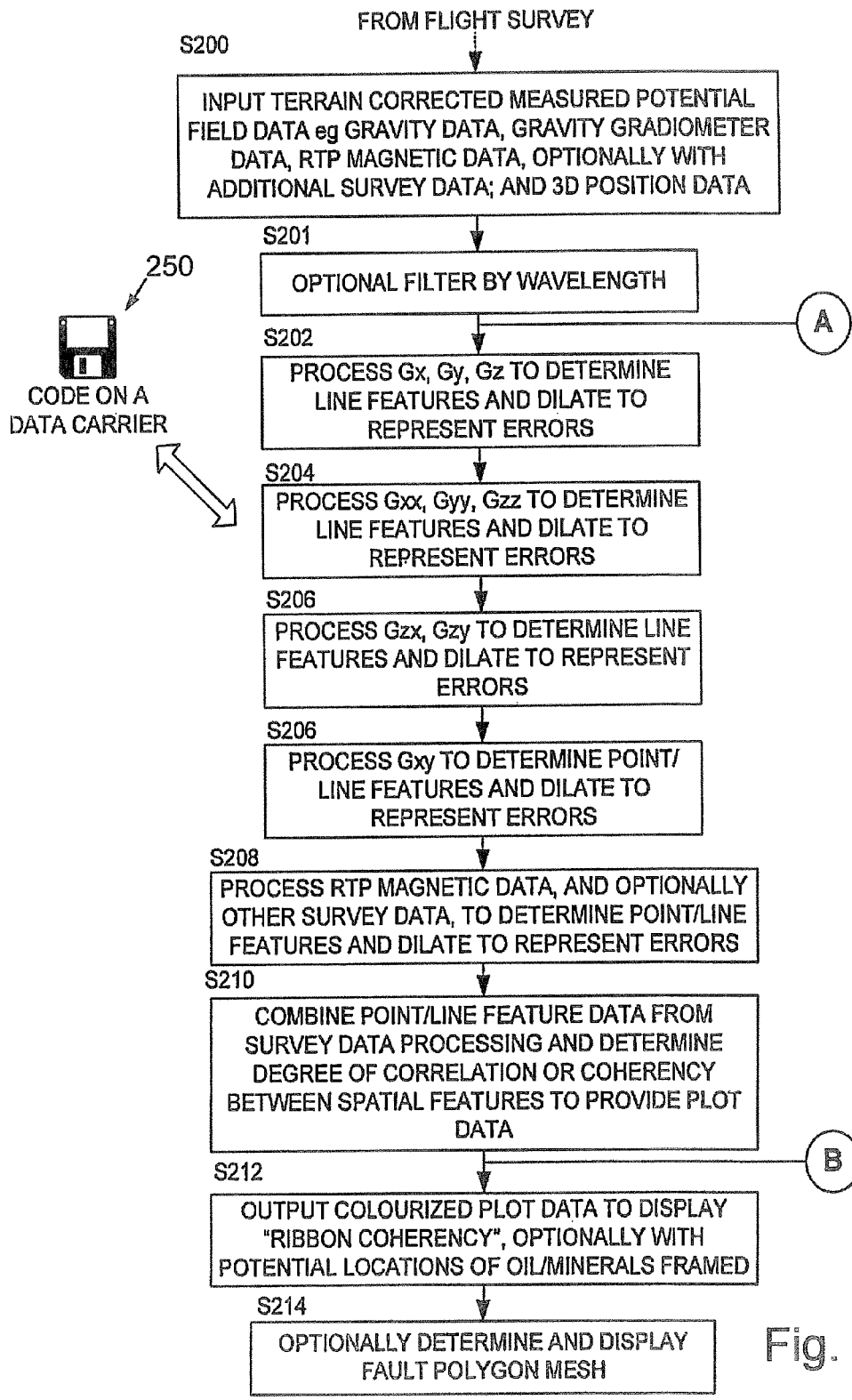
FIG. 2 shows a procedure for a computer programme to process potential field data to represent underlying geology in terms of correlation over a set of lines, according to an embodiment of an aspect of the invention.

Referring to FIG. 2, an input to the procedure comprises measured potential field data, preferably including gravity data, gravity gradient data, and RTP (reduced-to-pole) magnetic data as well as optionally, additional survey data such as lidar data, hyperspectral image data, soil analysis data and the like. The potential field survey data has associated 3D position data defining a location on the earth's surface and a height above the earth's surface for each measurement (other survey data may only have 2D position information). Preferably the potential field data is provided to the procedure after terrain correction as described above, although optionally this may be performed as part of the procedure illustrated in FIG. 2.

Preferably, although not essentially, the procedure then filters the potential field data by spatial wavelength to target geology at different depths (step 201).

Then, at step 202, the procedure processes vector gravity field components $G_x$, $G_y$ and $G_z$ to determine line features and then dilate the determined interpretation lines to represent an approximate error margin, for example 100 meters. An estimate of this error margin may be determined, for example, from the separation of the flight lines optionally with an additional amount put in "by hand" to account for inherent noise in the instrumentation and possibly expected false positives arising from anomalous geology. Although not essential, it is preferable that all the gravity field components are employed, to maximise the information on which a determination of the geology is being made.

Figure 3B:
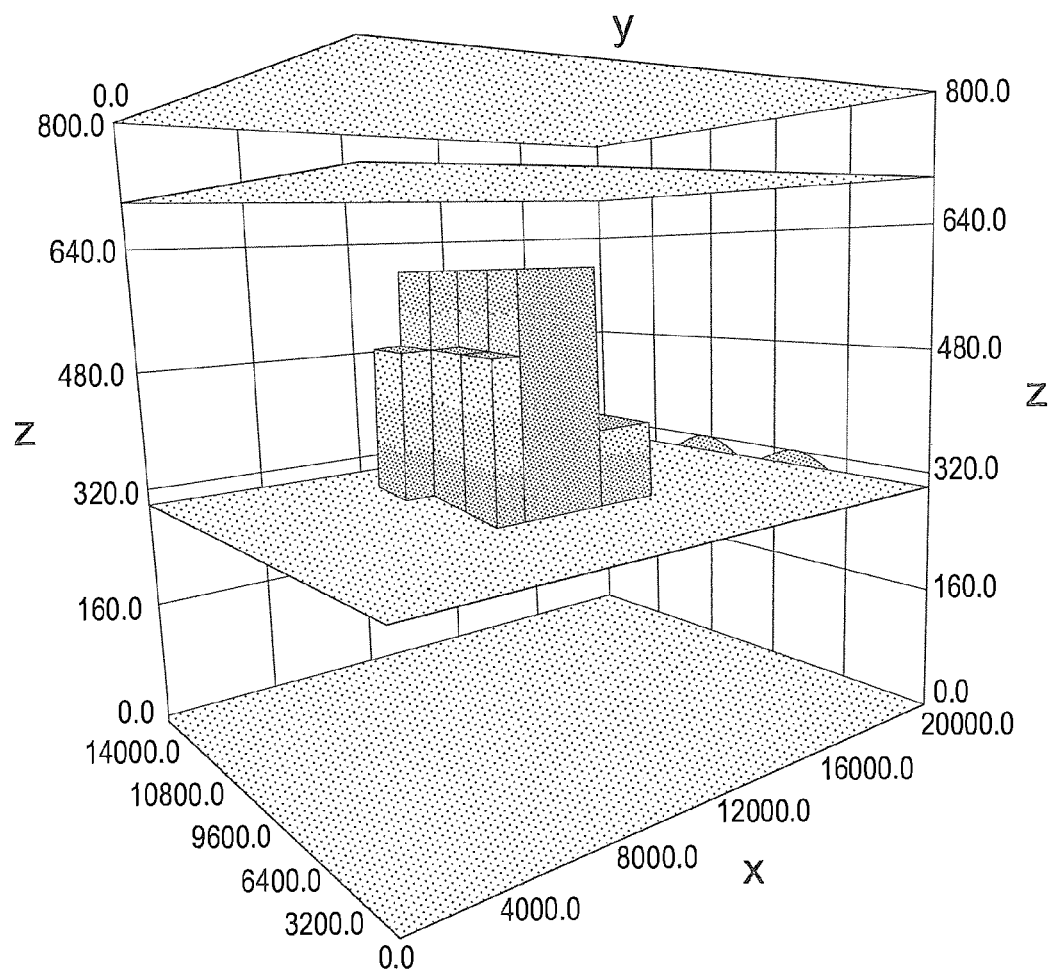
Figure 3C:
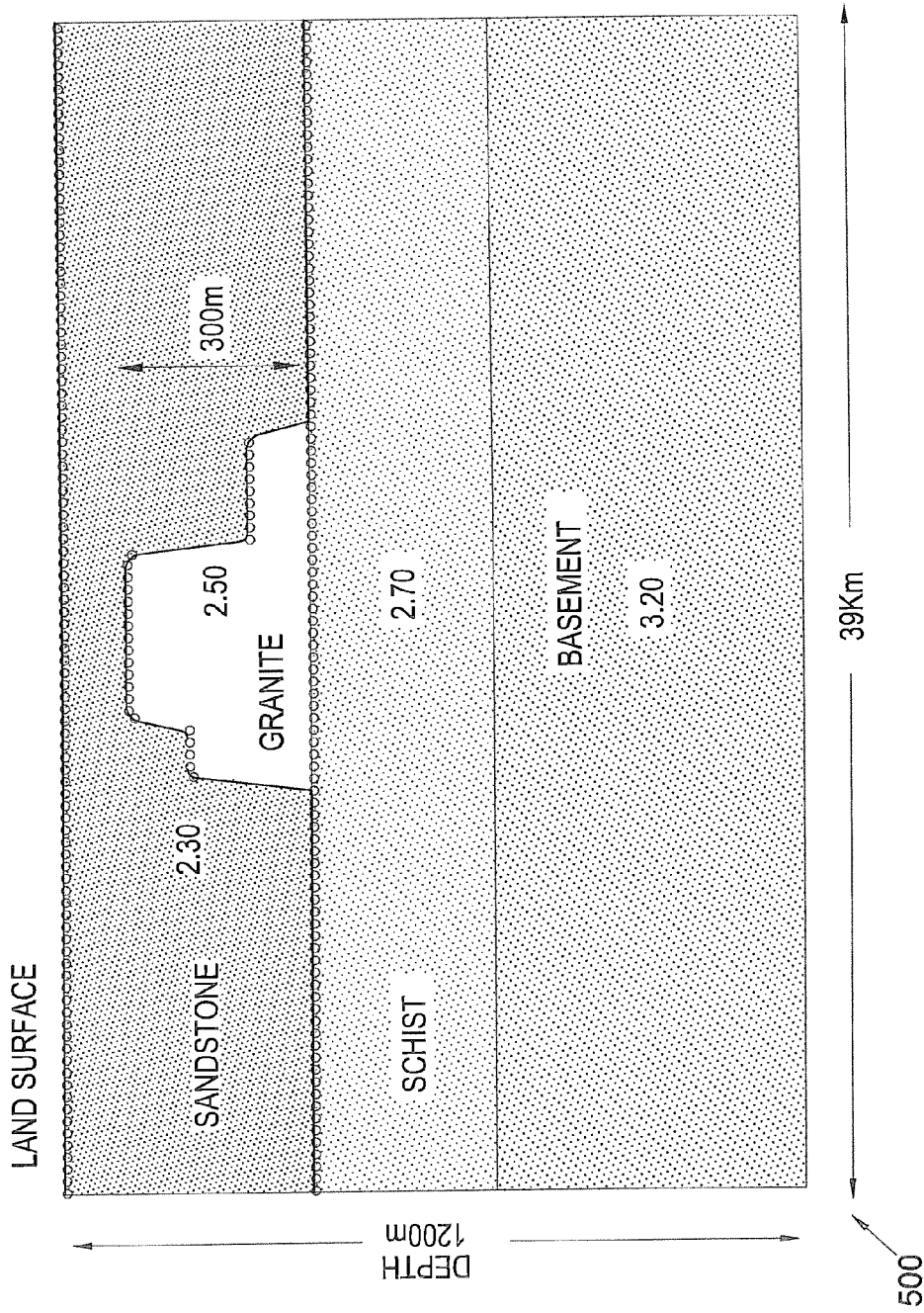
Figure 3D:
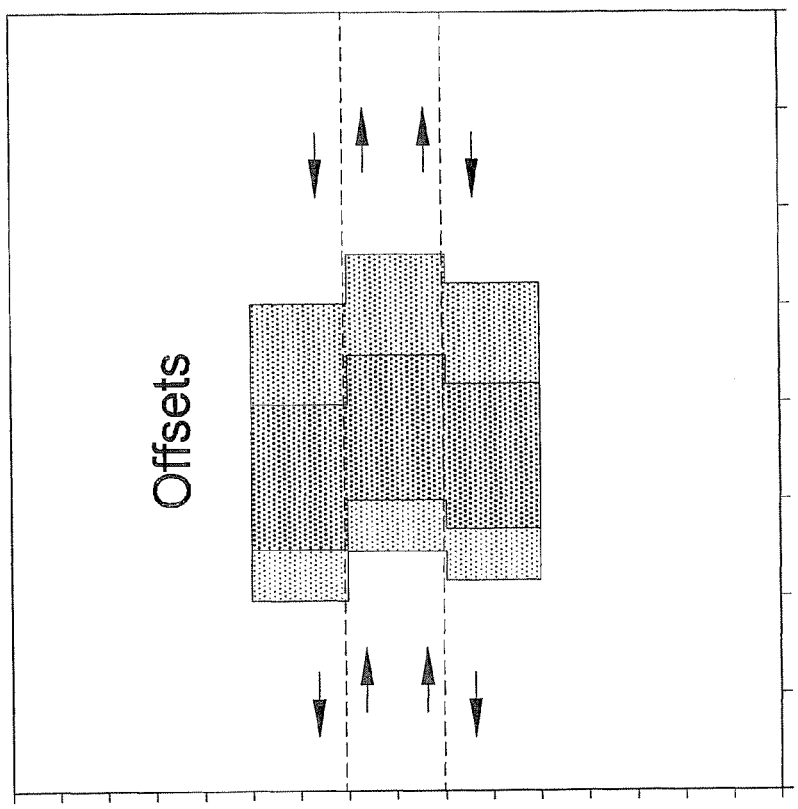
Figure 3D:
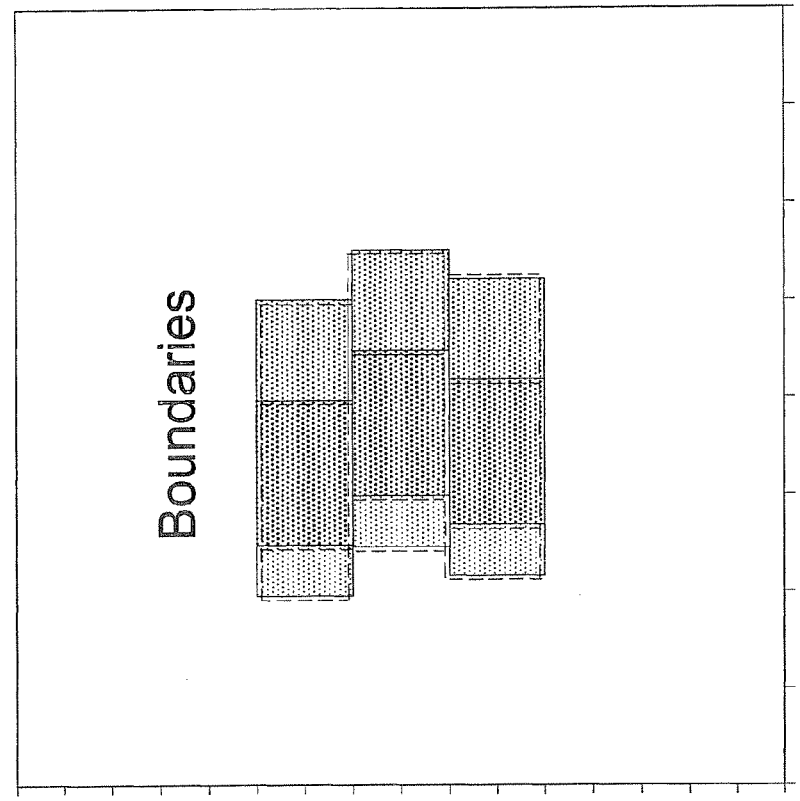

It is helpful at this stage, to aid understanding of embodiments of the invention, to illustrate processing of the various vector and tensor components of the measured, terrain corrected potential field. This is conveniently done using a model of a faulted subterranean body as shown in FIGS. 3a to 3d. Thus FIGS. 3a and 3b (in which the scales are in meters) show first and second 3D perspective views of the surface of a faulted subterranean body of dimensions 16 km by 16 km by 300 meters high, and FIG. 3c shows a 2D vertical cross section through the body of FIGS. 3a and 3b showing the different rock types and densities in g/cm$^2$. FIG. 3d illustrates the boundaries of the subterranean body in map view and "offsets" of the subterranean body, also in map view, such as may be caused by, for example, strike slip faults along the horizontal dotted lines.

Figure 4A:
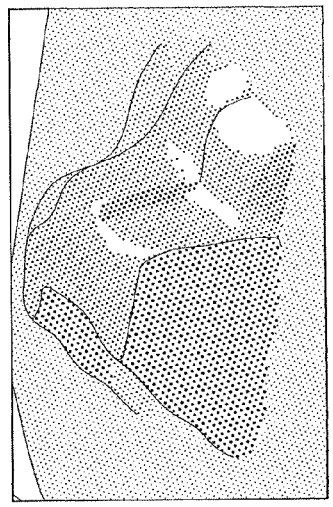
FIGS. 4a to 4c show, respectively, modelled gravity component $G_z$ for the subterranean body of FIG. 3, and corresponding interpretation lines and dilated interpretation lines.
Figure 4A:
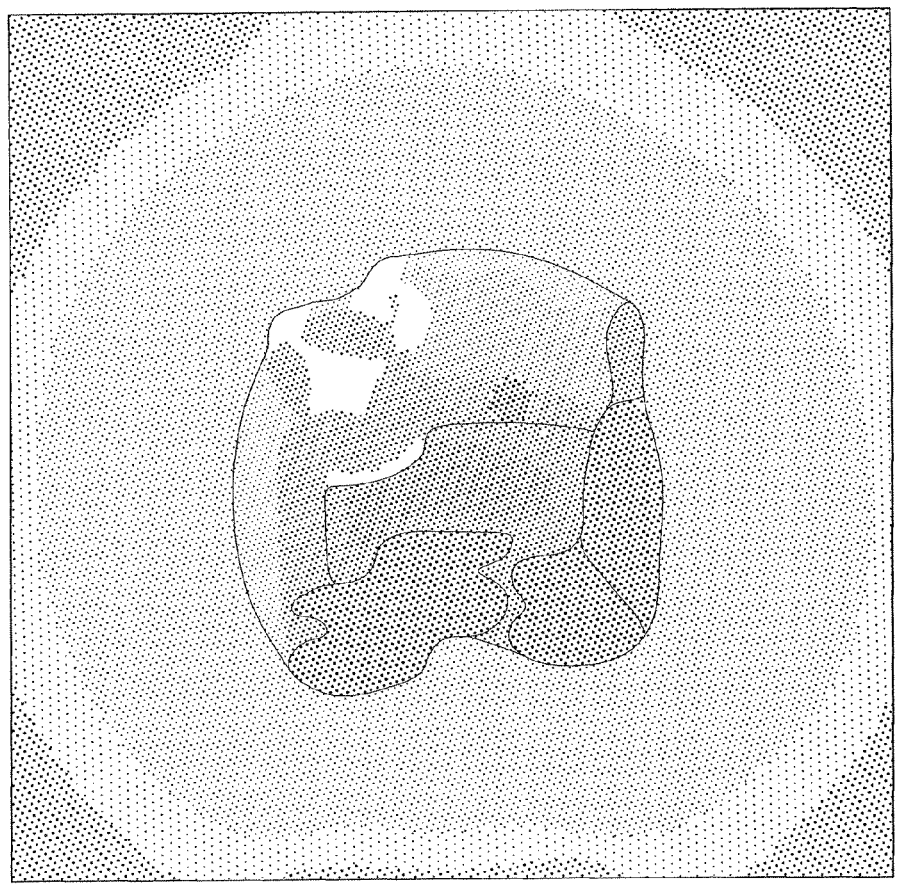
Figure 4B:
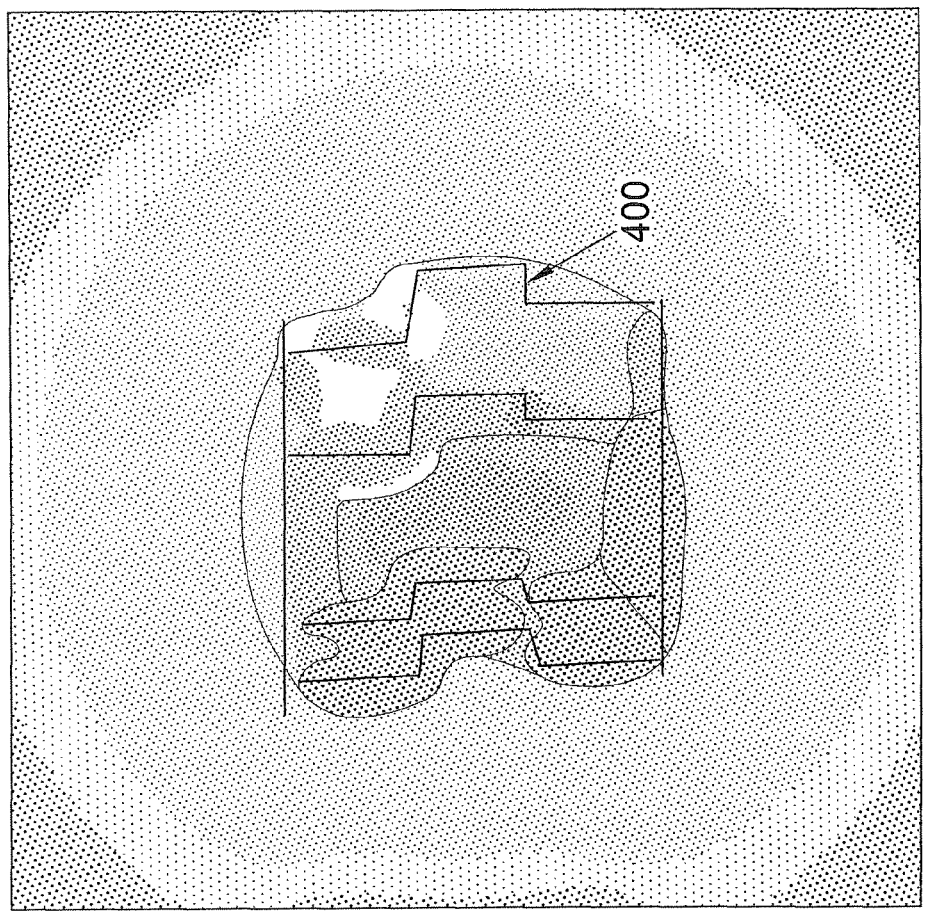
Figure 4C:
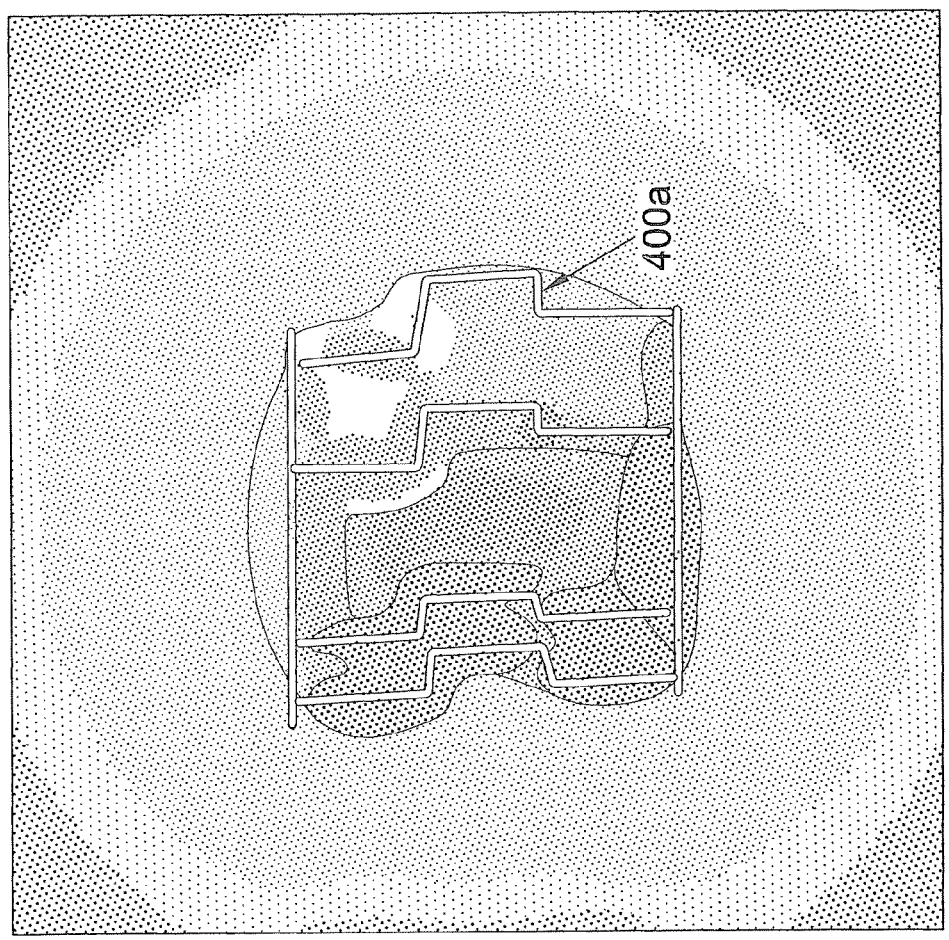

Referring next to FIG. 4, this illustrates processing of (modelled) gravity component $G_z$, FIG. 4a illustrating modelled $G_z$ in plan and 3D perspective view. To process a gravity signal such as $G_z$ interpretation lines 400 are added as illustrated in FIG. 4b, for example by identifying lines of inflection in the signal (that is where the radius of curvature goes from positive to negative or vice versa). Preferably these interpretation lines are then buffered to a margin of error to generated dilated lines 400a as shown in FIG. 4c. Optionally the degree of dilation may be adjusted by a user on a project-by-project basis.

Figure 5A:
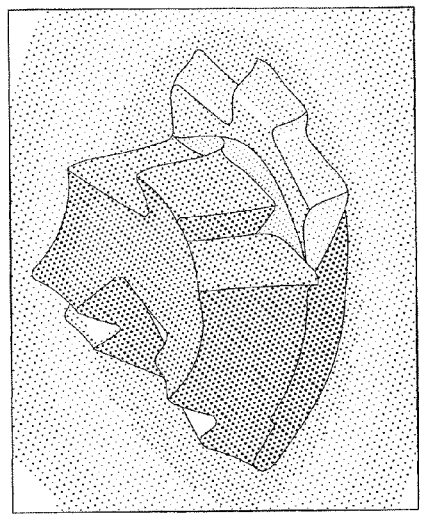
FIGS. 5a to 5c show, respectively, plan and perspective views of $G_{zz}$ for the subterranean body of FIG. 3, and corresponding sets of interpretation lines.
Figure 5A:
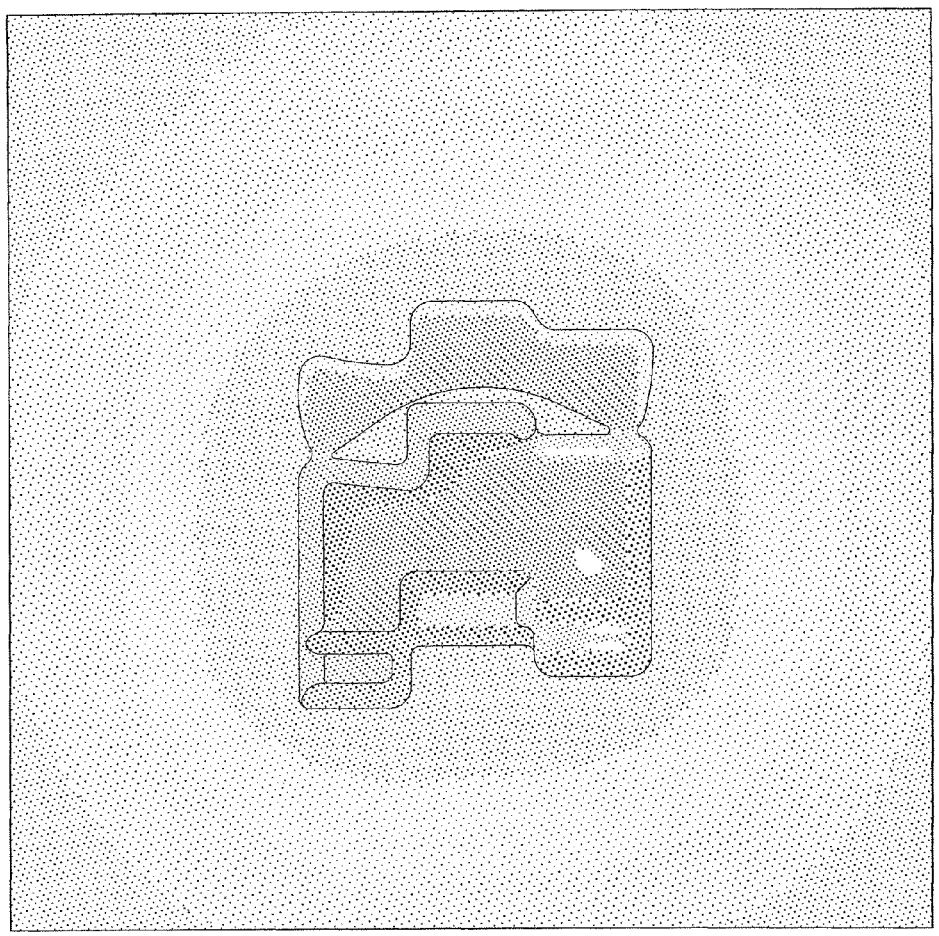
Figure 5B:
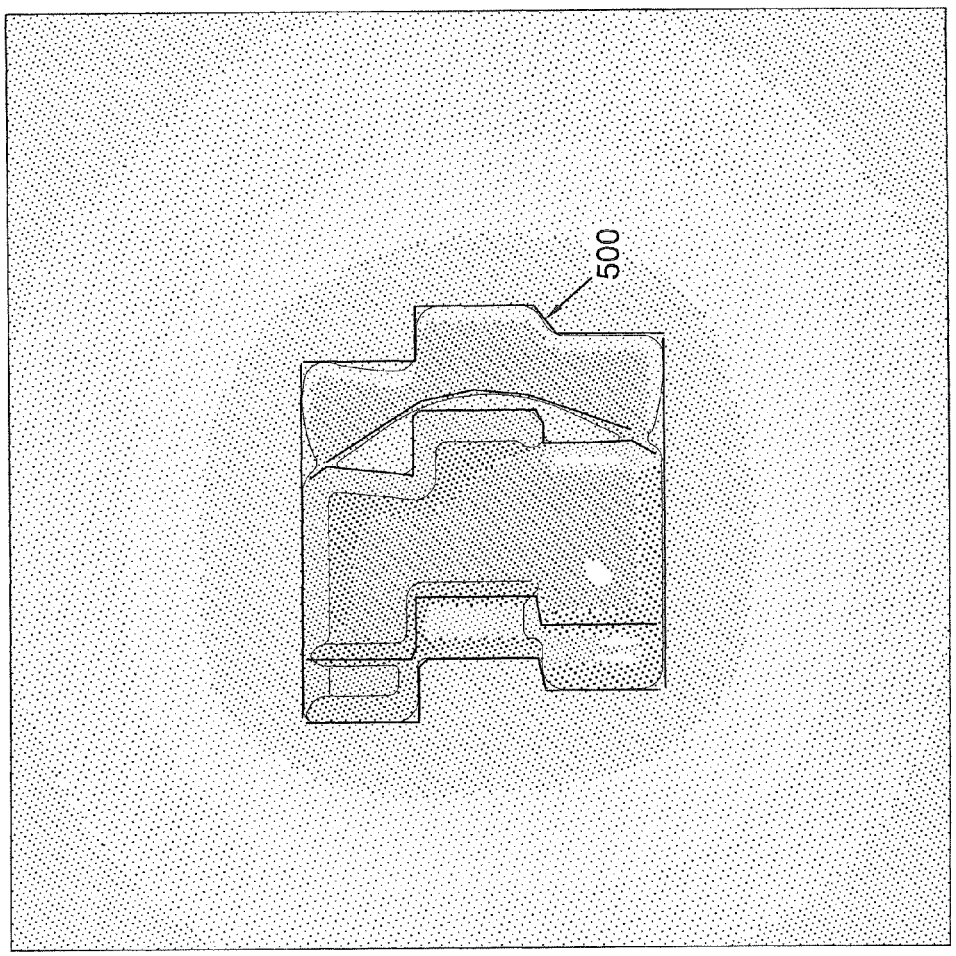
Figure 5C:
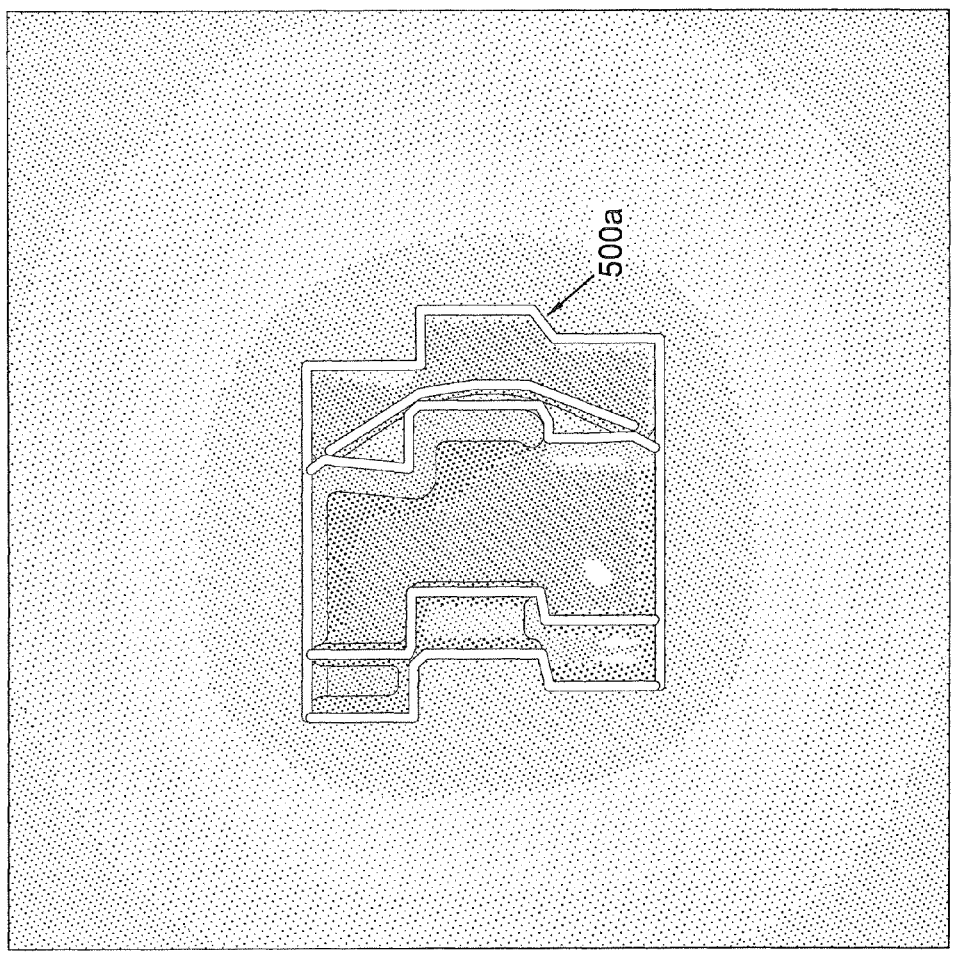

Referring again to FIG. 2, the procedure next processes (step 204) gravity gradient components $G_{xx}$, $G_{yy}$ and $G_{zz}$, again to determine lines for interpreting the underlying geology. Thus referring to FIG. 5a, this shows, in plan and perspective views, $G_{zz}$ for the subterranean body of FIG. 3. In FIG. 5b this data has been processed to identify points/lines of inflection 500, and in FIG. 5c these have been dilated 500a to represent errors. Preferably a single dilation value is used for all the interpretation lines—that is in embodiments of the method the widths of the interpretation lines derived from different potential fields/potential field components are substantially the same. As can be seen, the $G_{zz}$ signal provides a sharper representation of the subterranean body than $G_z$.

Figure 6A:
FIGS. 6a to 6c, show plan and perspective views of $G_{xx}$ and added geological interpretation lines.
Figure 6A:
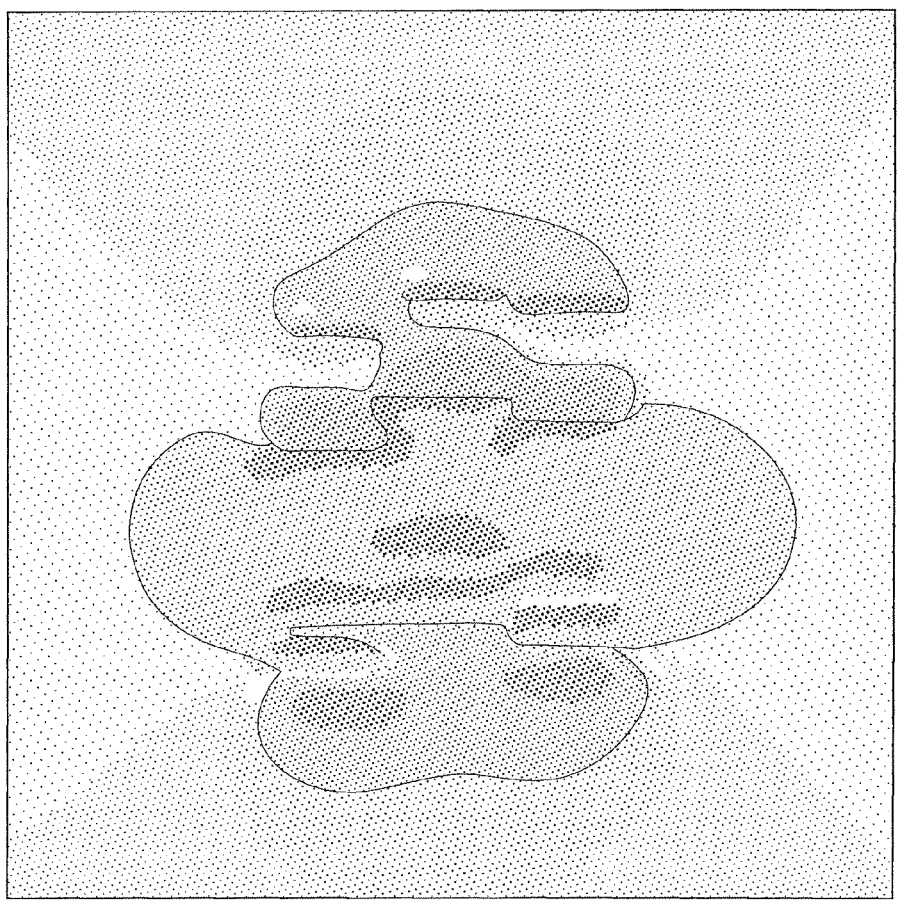
Figure 6B:
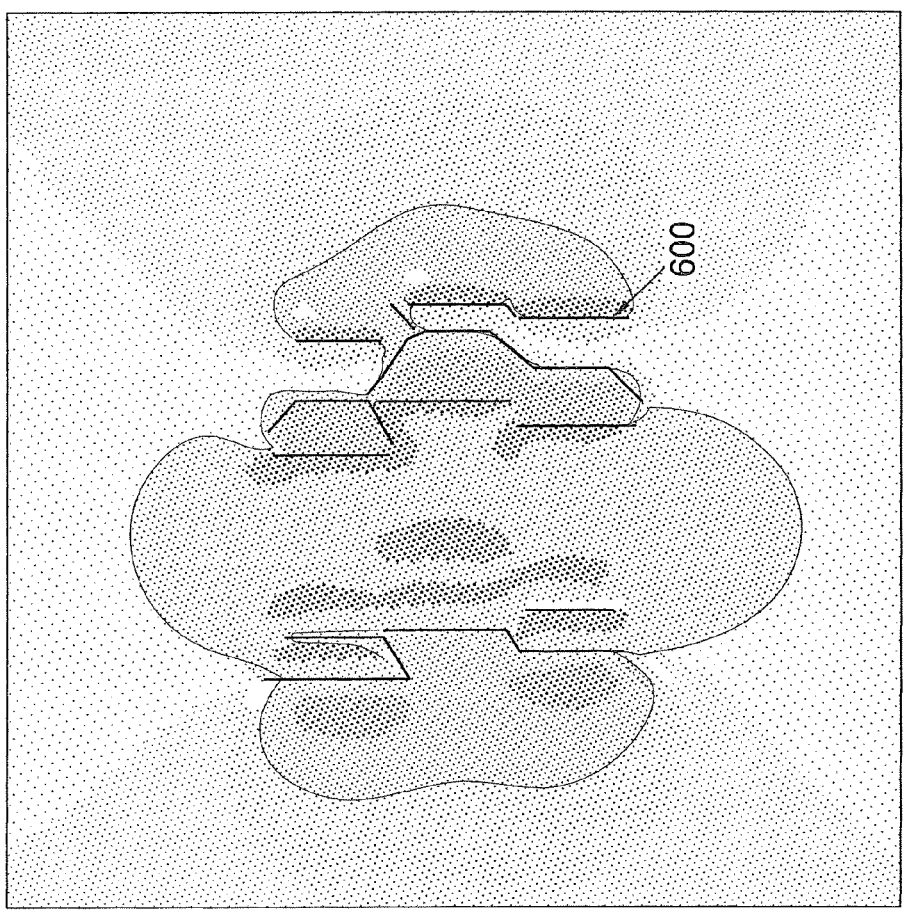
Figure 6C:
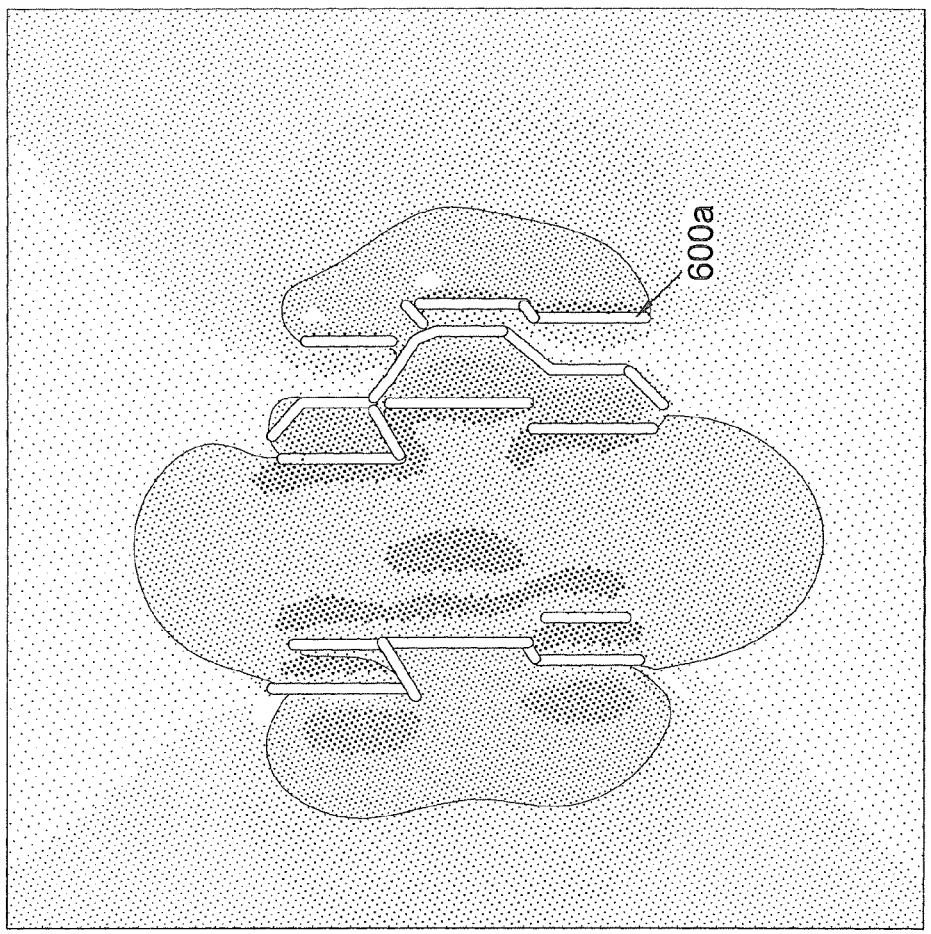

FIGS. 6a to 6c illustrate processing of the $G_{xx}$ signal to generate interpretation lines 600, enlarged 600a to take account of errors. Broadly speaking the $G_{xx}$ signal picks out edges in the y direction, points/lines of inflection 600, 600a representing these edges. The skilled person will understand that the choice of rotation of the x-y axis is arbitrary and, optionally, these axis may be rotated to determine whether features of particular geological interest become more apparent.

Figure 7A:
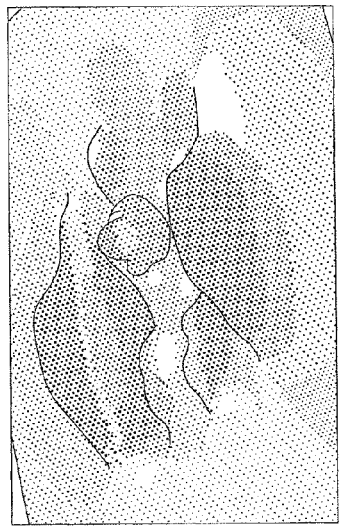
FIGS. 7a to 7c, show modelled $G_{yy}$ for the subterranean body of FIG. 3 and corresponding sets of lines of interpretation.
Figure 7A:
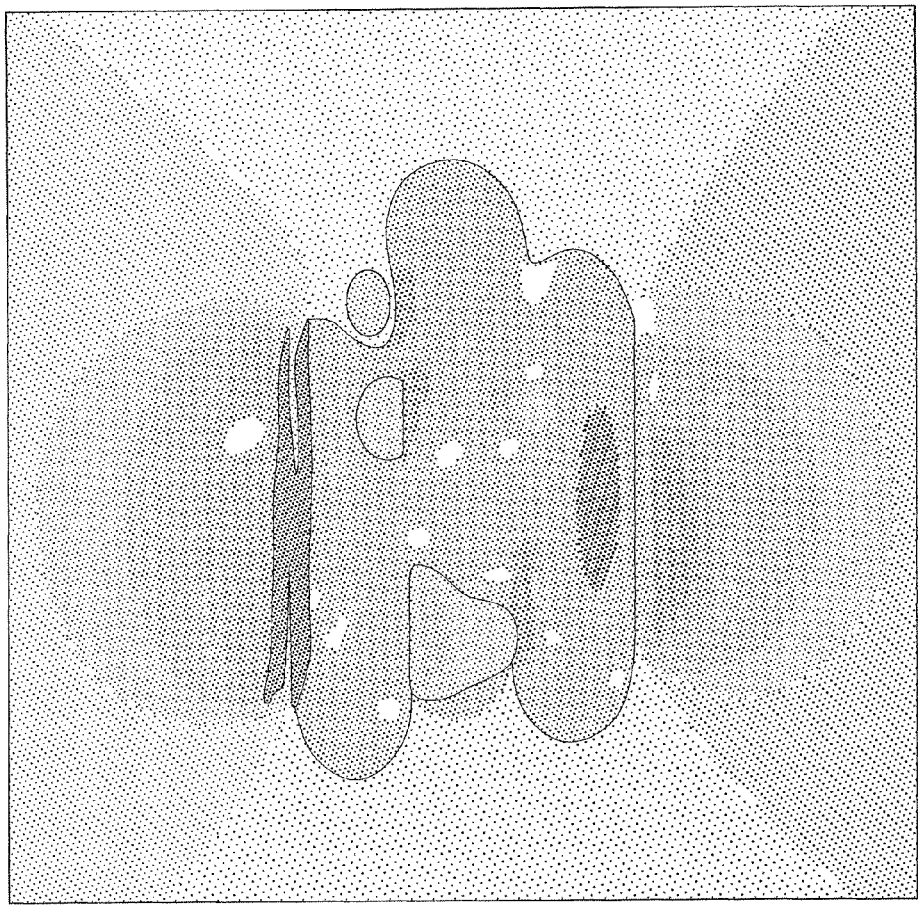
Figure 7B:
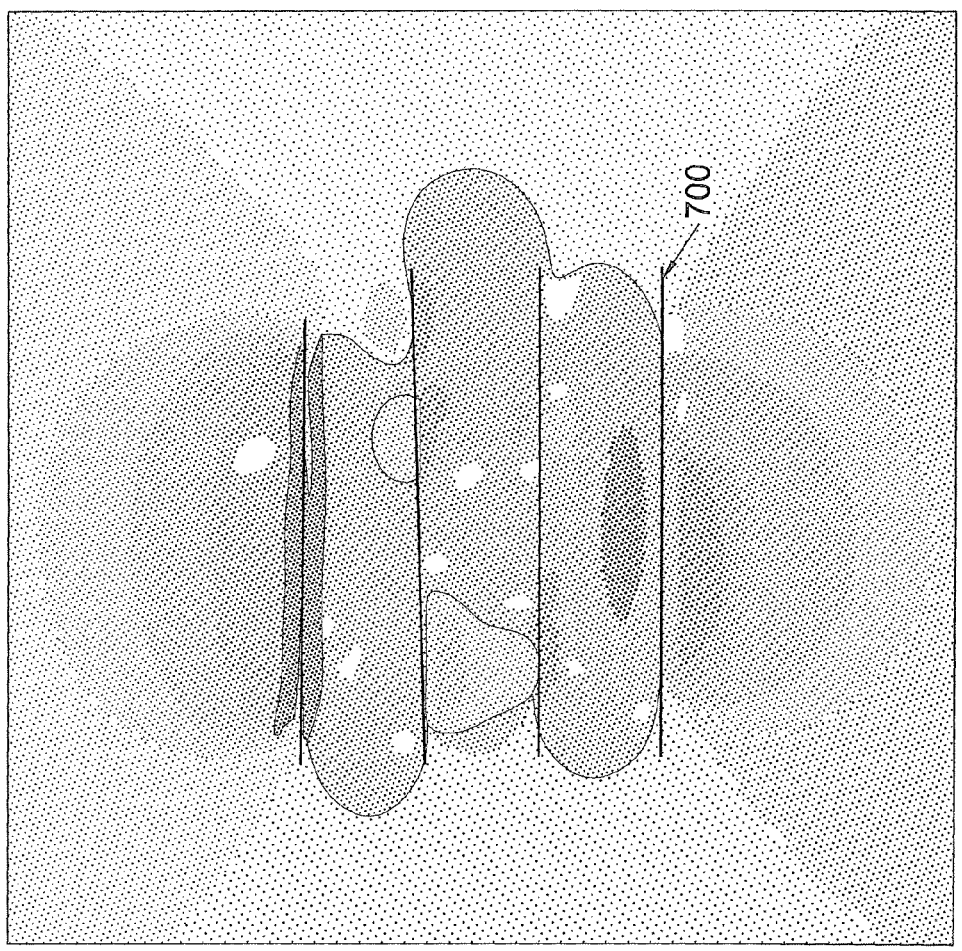
Figure 7C:
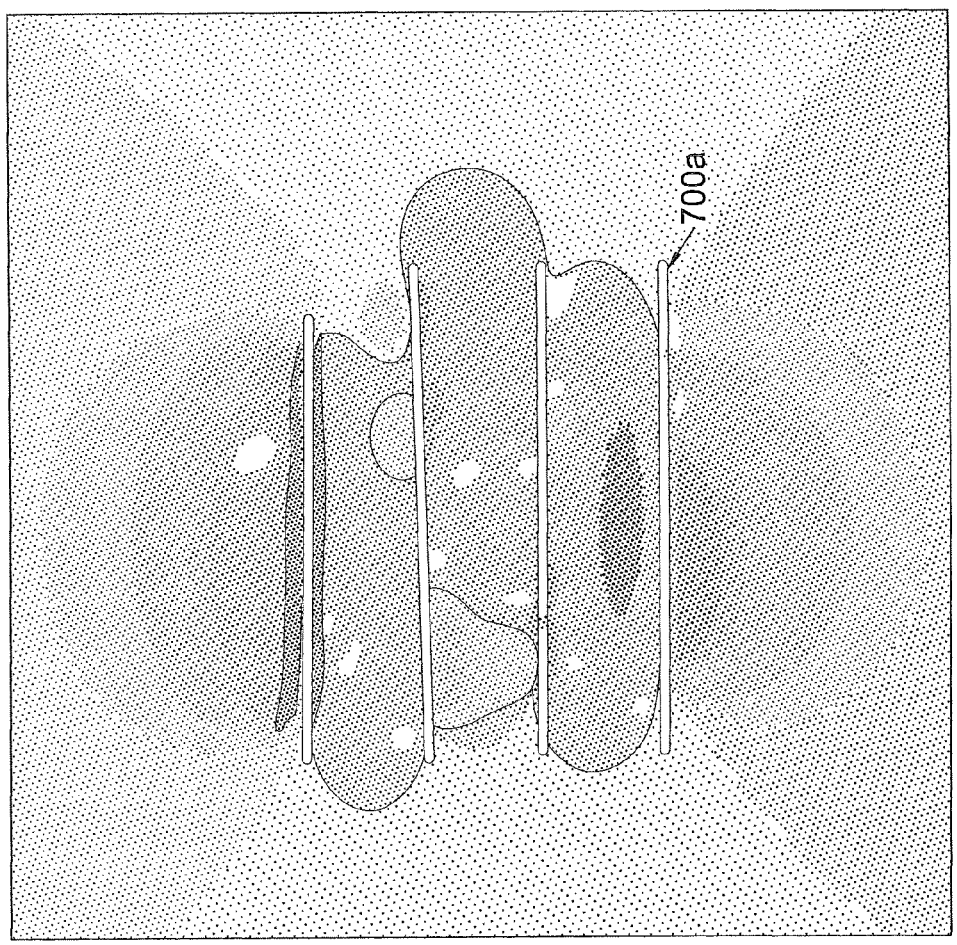

FIG. 7a shows plan and perspective views of $G_{yy}$ in which points/lines of inflection pick out edges in the x direction (in a complementary manner to $G_{xx}$). FIGS. 7b and 7c show interpretation lines 700, dilated 700a to take account of errors. Again the x-y axis may be rotated to search for features of particular geological interest.

Figure 8A:
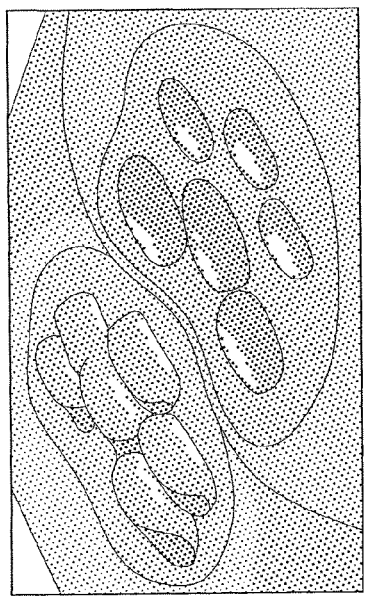
FIGS. 8a to 8c show modelled $G_{zx}$ for the subterranean body of FIG. 3 and corresponding sets of geological interpretation lines.
Figure 8A:
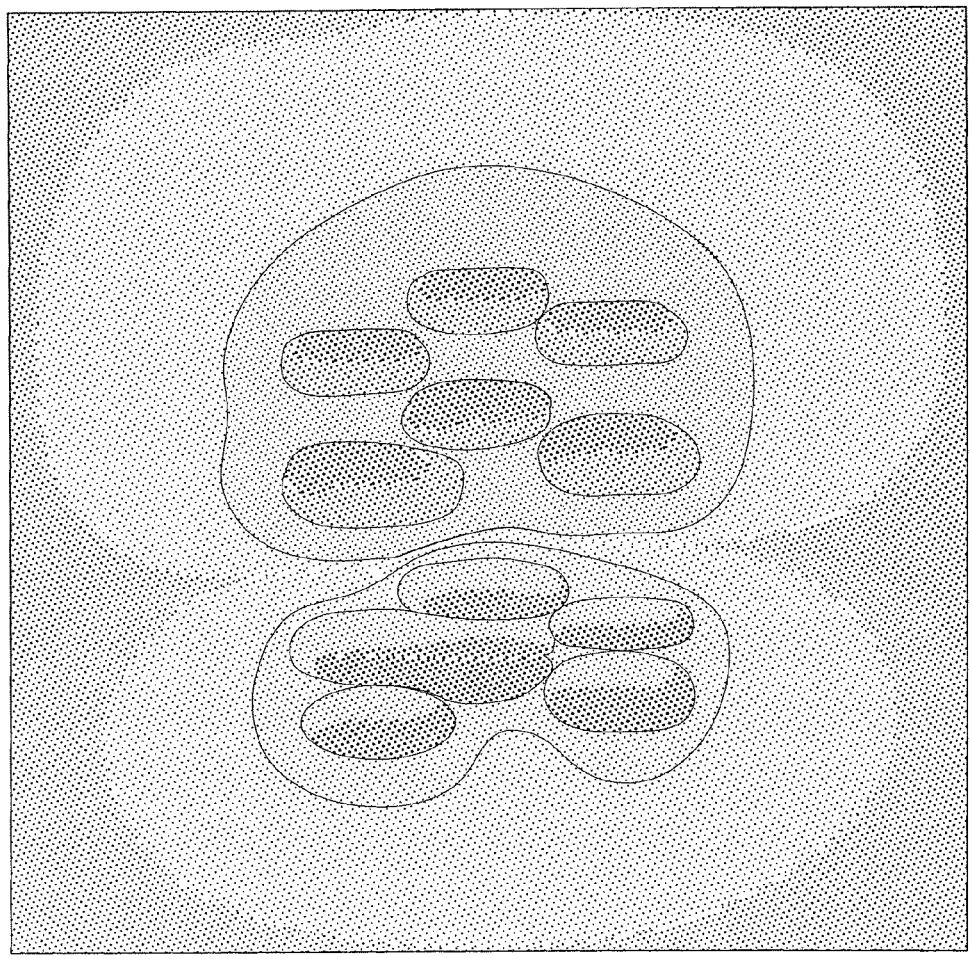
Figure 8B:
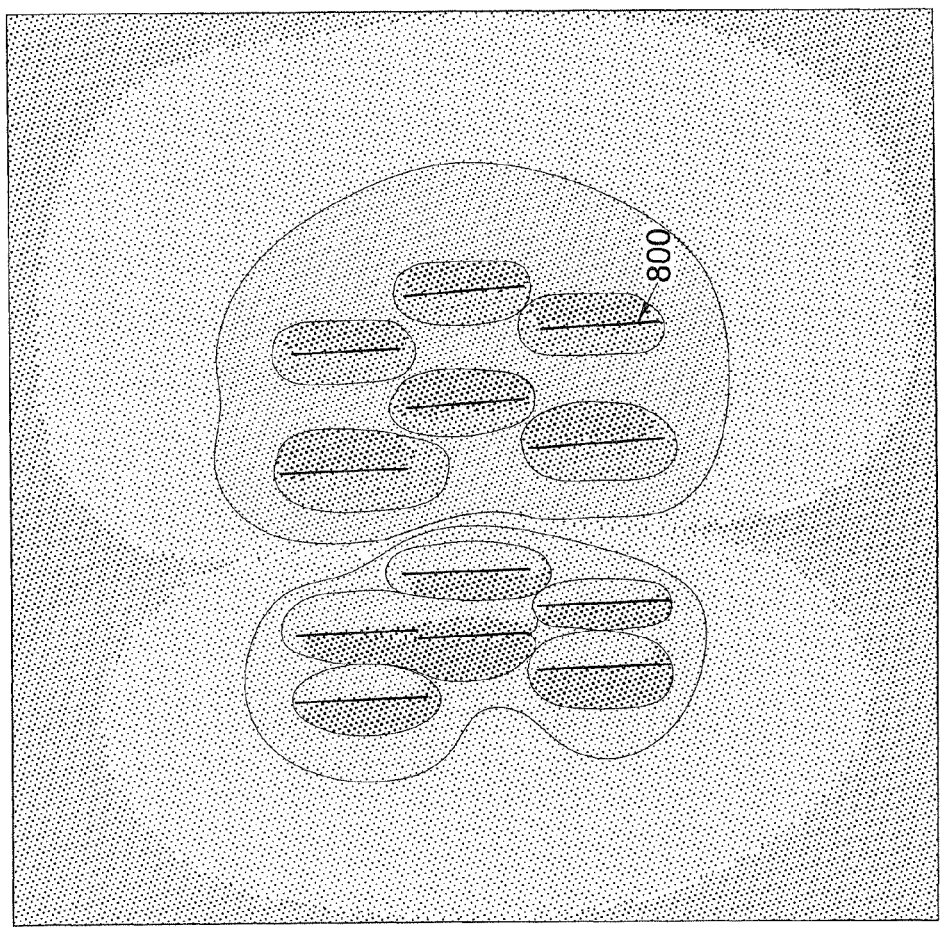
Figure 8C:
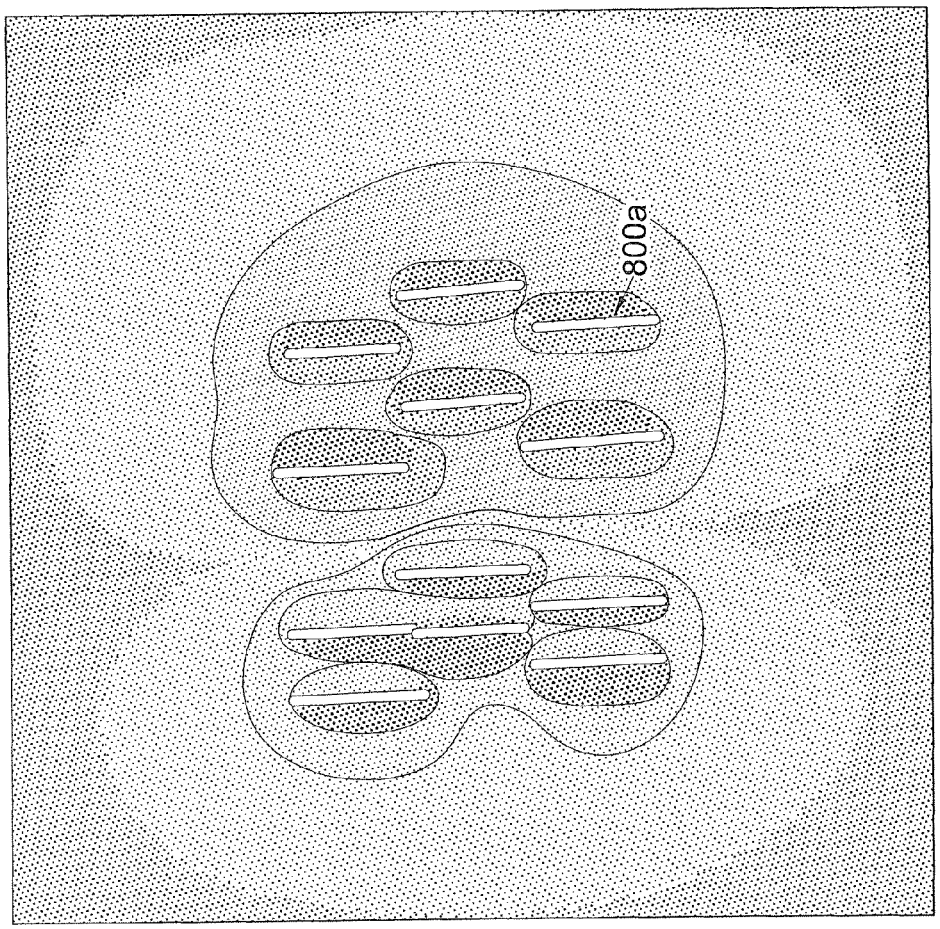
Figure 9A:
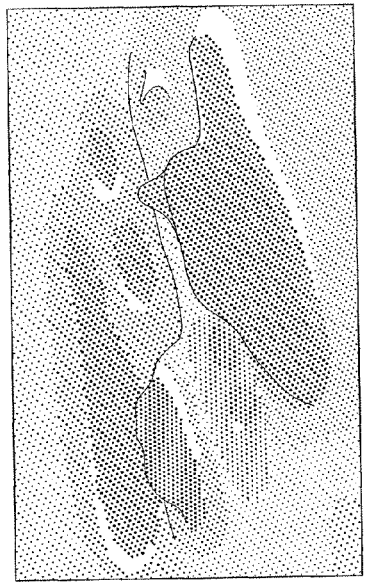
FIGS. 9a to 9c show modelled $G_{zy}$ for the subterranean body of FIG. 3, and corresponding sets of geological interpretation lines.
Figure 9A:
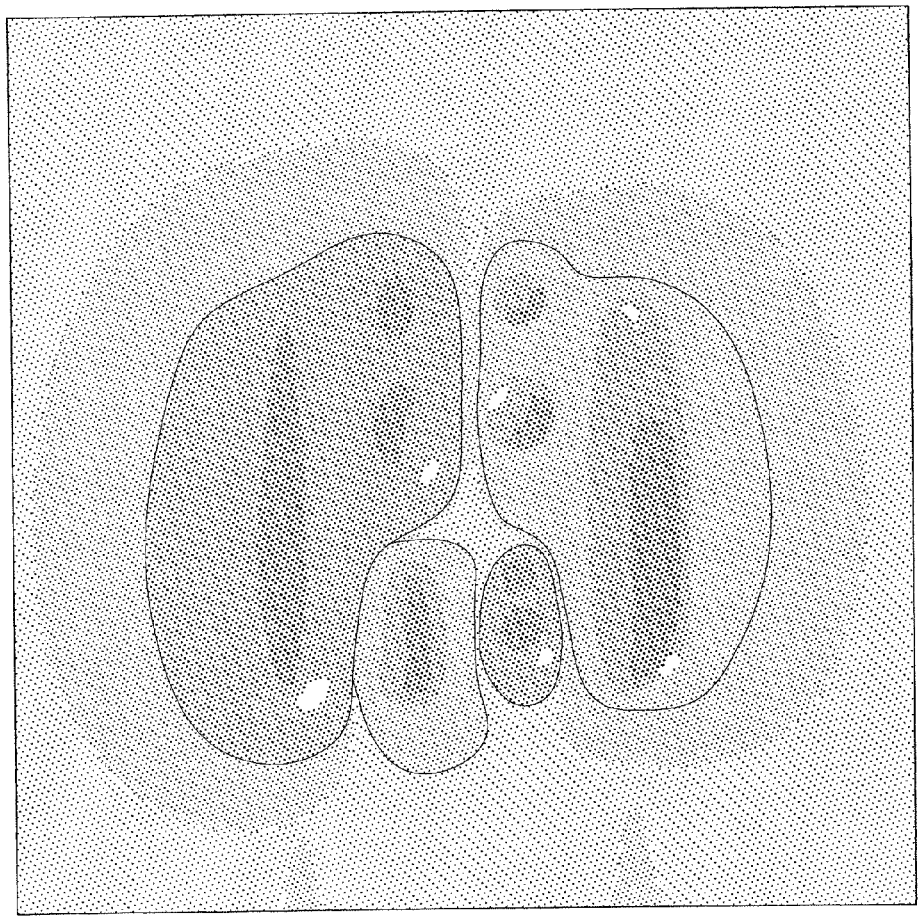
Figure 9B:
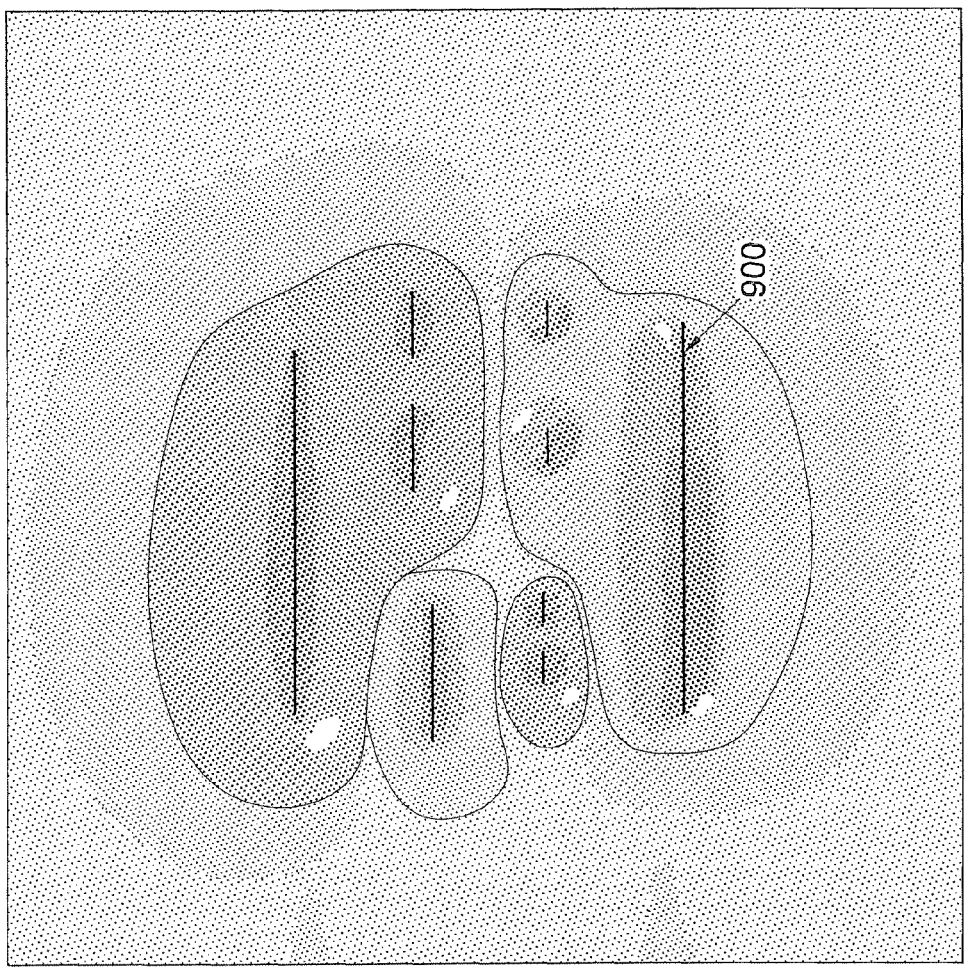
Figure 9C:
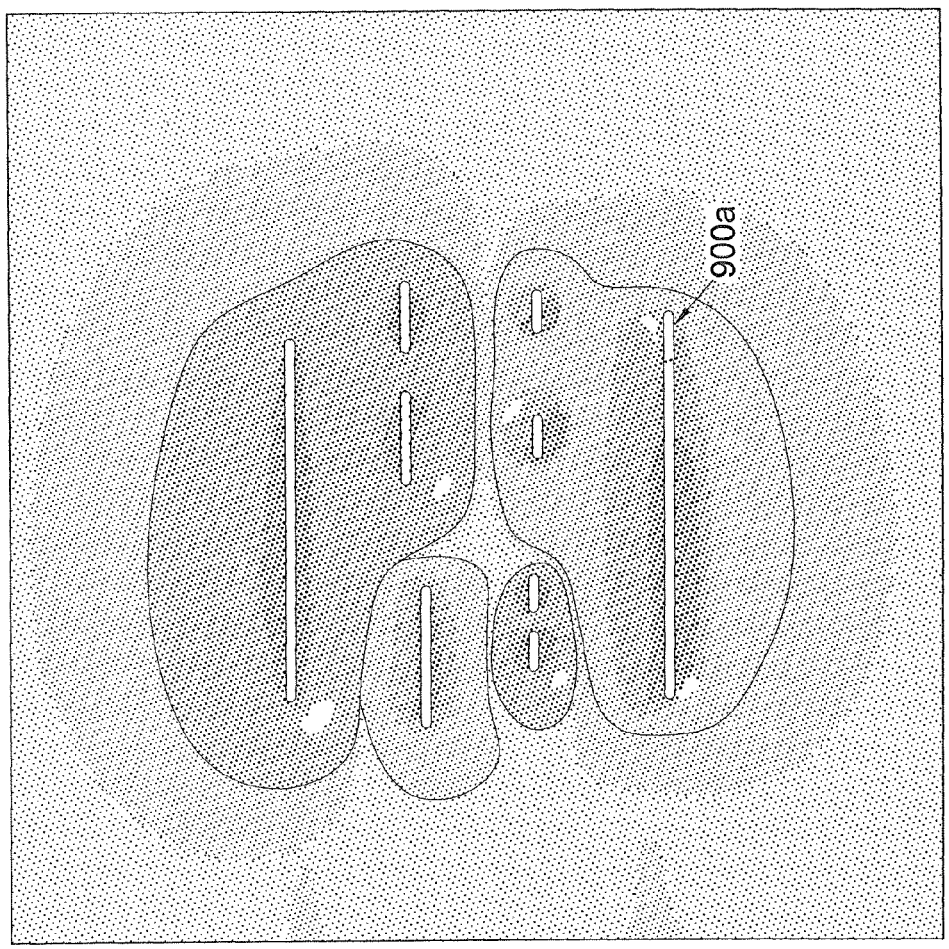

Referring again to FIG. 2, at step S206 the procedure then processes gravity gradient components $G_{zx}$ and $G_{zy}$, in these cases to identify points/lines defining maxima or minima (closely spaced maxima/minima may be joined to form lines). Broadly speaking the $G_{zx}$ and $G_{zy}$ tensor components emphasise FIGS. 8a to 8c show plan and perspective views of $G_{zx}$ and corresponding lines of interpretation 800, 800a, and FIGS. 9a to 9c show plan and perspective views of $G_{zy}$ and corresponding lines of interpretation 900, 900a.

Figure 10A:
FIGS. 10a to 10c show, respectively, plan and 3D perspective views of modelled $G_{xy}$ for the subterranean body of FIG. 3, construction of points/lines of geological interpretation, and dilated points/lines to take account of error.
Figure 10A:
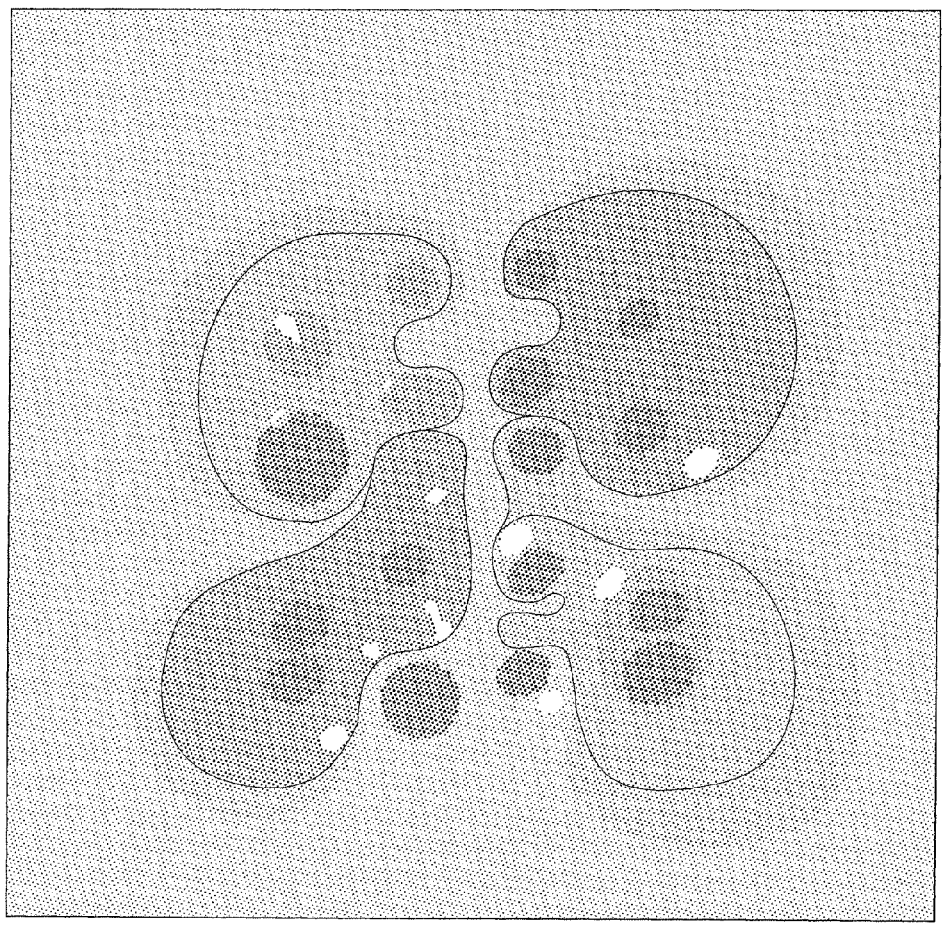
Figure 10B:
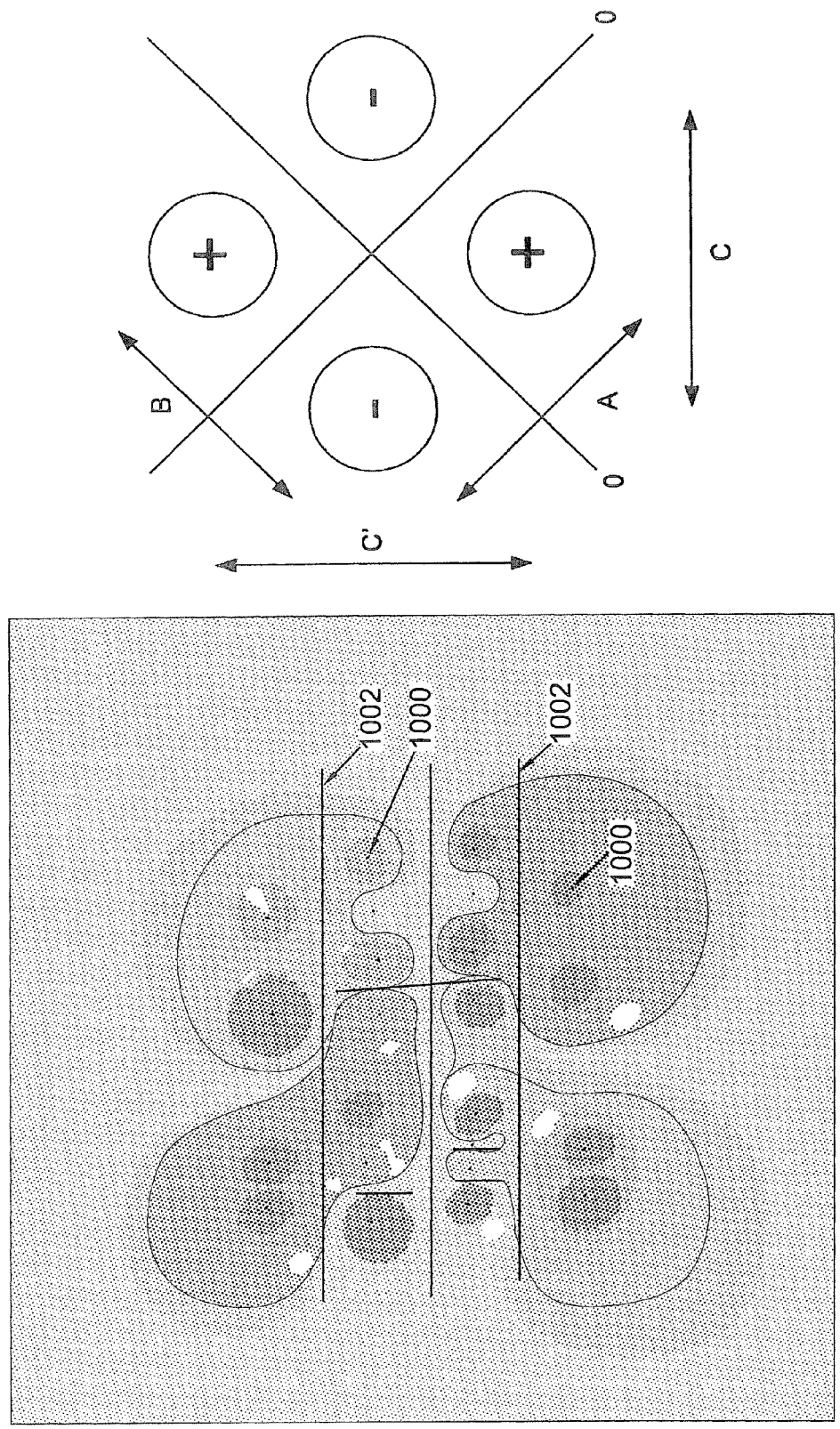
Figure 10C:
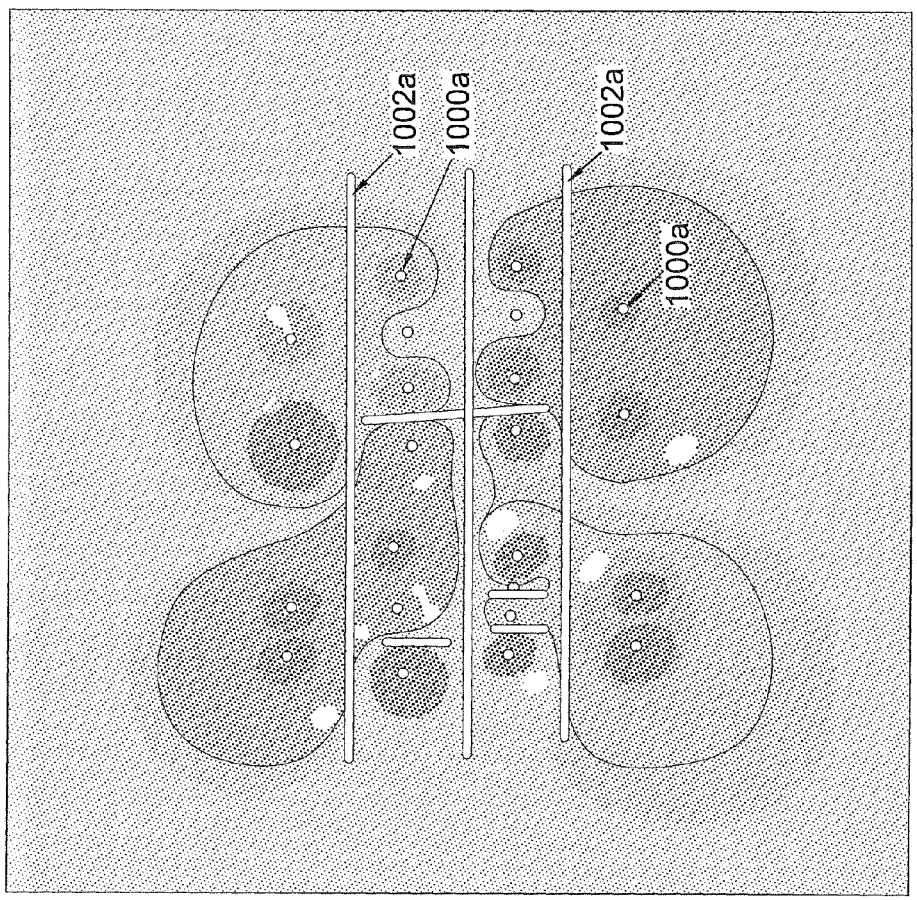

Referring again to FIG. 2, at step 206 the procedure processes $G_{xy}$ to determine point/line features and dilates these to represent errors, as previously described. FIG. 10a shows plan and perspective views of $G_{xy}$ for the modelled subterranean body of FIG. 3; the procedure processes this data to identify maxima/minima points 1000, 1000a and, preferably, also adds lines 1002 between these points to locally divide maxima from minima. Such a trend line is preferably only added when there is greater than a threshold difference between the maximum and an adjacent minimum. This is because the $G_{xy}$ signal tends to pick out the corners of a subterranean body. As shown by the inset in FIG. 10b, the maxima/minima tends to appear as pairs of dipoles separated by lines of zero signal and if desired, the ratio lengths A:B illustrated can be used to estimate the sharpness of a corner of an extended body whilst the separation C (or C') between minima (or maxima) is proportional to the depth of the ("corner") feature.

Figure 11A:
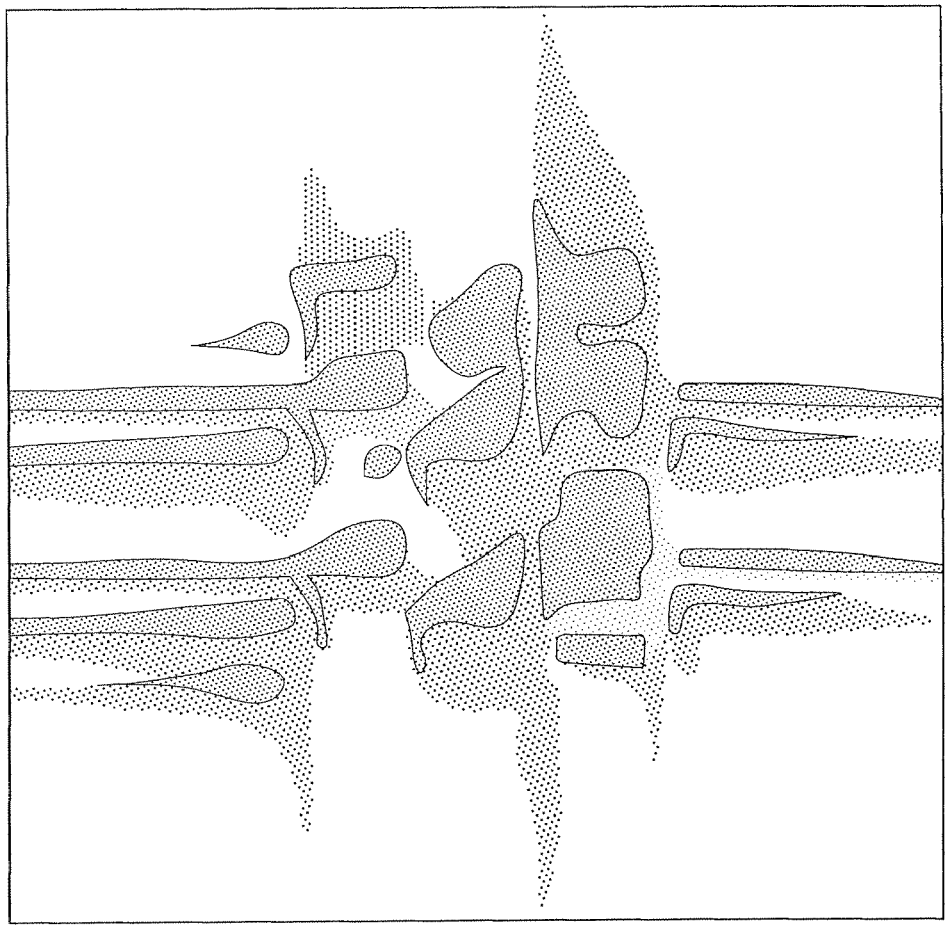
FIGS. 11a to 11c show, respectively, a plan of modelled RTP magnetic field data for the subterranean body of FIG. 3, construction of points/lines of geological interpretation, and dilated points/lines to take account of error.
Figure 11B:
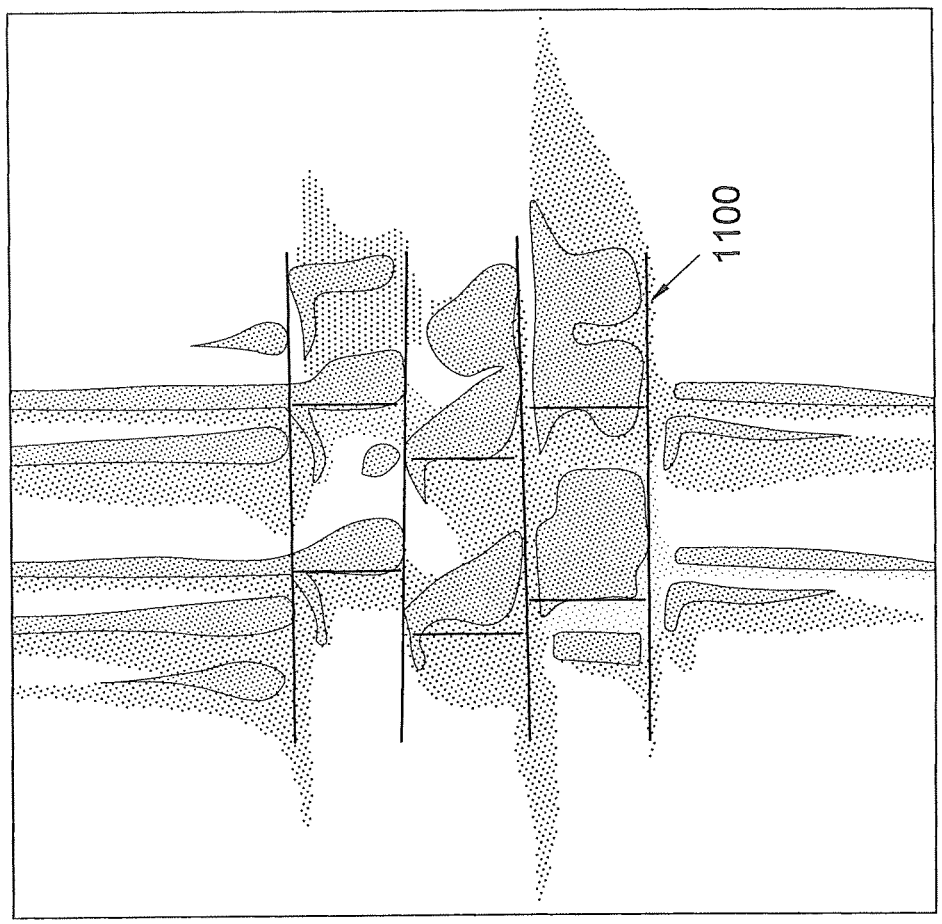
Figure 11C:
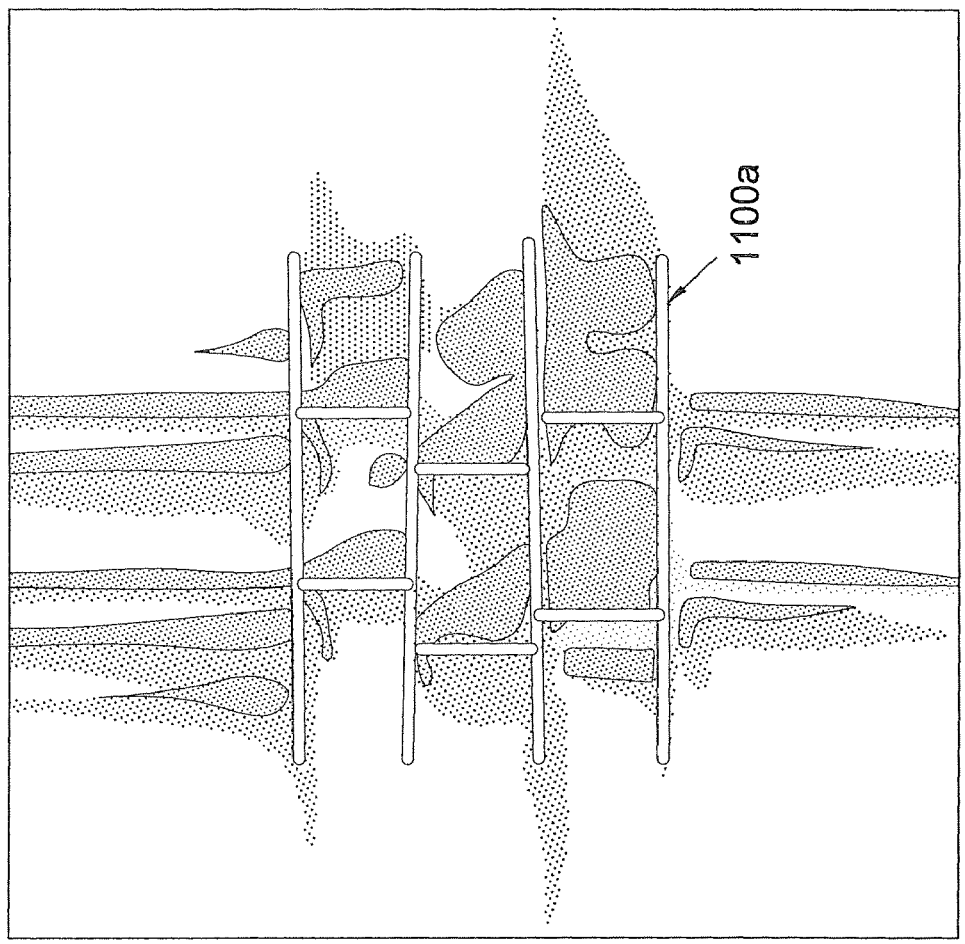

As previously mentioned, preferably all the gravity gradient tensor components are employed, to make best use of the available information. Preferably, where available, the procedure then continues to process (step 208) RTP magnetic data, and optionally other survey data where available, again to identify point/line features representing the underlying geology of the surveyed region. Thus FIG. 11a shows the modelled RTP magnetic field for the subterranean body of FIG. 3 and FIG. 11b shows the data of FIG. 11a with trend lines 1100 added by identifying significant longitudinal features. (As can be seen in FIG. 11b, the trend lines have been added where maxima/mimima above a threshold can be identified; these trend lines have been "quantised" in the sense that, for clarity, lengths below a threshold length are not permitted and, optionally, where a trend feature is identified a length may be extended for clarity and/or truncated with hysteresis by comparison with a threshold significance of a maximum/minimum inflection). Again preferably the lines are dilated 1100a to account for errors, as previously described, as illustrated in FIG. 11c. For hyperspectral and other survey data the skilled person will understand that similar techniques to those described above may be implemented to identify points/lines of maxima/minima/inflection, for combination with spatial features identified from potential field survey data, as described further below.

Once a plurality of sets of spatial features have been identified, for example as described above, the procedure then combines (at step 210) this data and determines a degree of correlation or coherency between the available sets of spatial features, in particular from the tensor components of the gravity gradient data and from the vector components of the gravity field and/or magnetic data. The skilled person will understand that there are many different ways in which to determine the degree of correlation between different sets of spatial features. For example in a simple approach the spatial feature are superposed upon one another in a common, geo-referenced set of coordinates and then regions of overlap are graded or colourised according to how many lines overlap one another. In embodiments warm (orange/red) colours may be used to represent areas where many interpretation lines overlap at a specific location and cool colours (blues) may be used to represent areas where few or none of the dilated geological interpretation lines cross one another. Alternatively greyscale graduation may be employed or contour lines or numbers used to represent the degree of correlation or coherence. From this the skilled person will understand that the order in which the various vector and tensor components of the potential field data are processed to obtain spatial features does not matter.

Figure 12A:
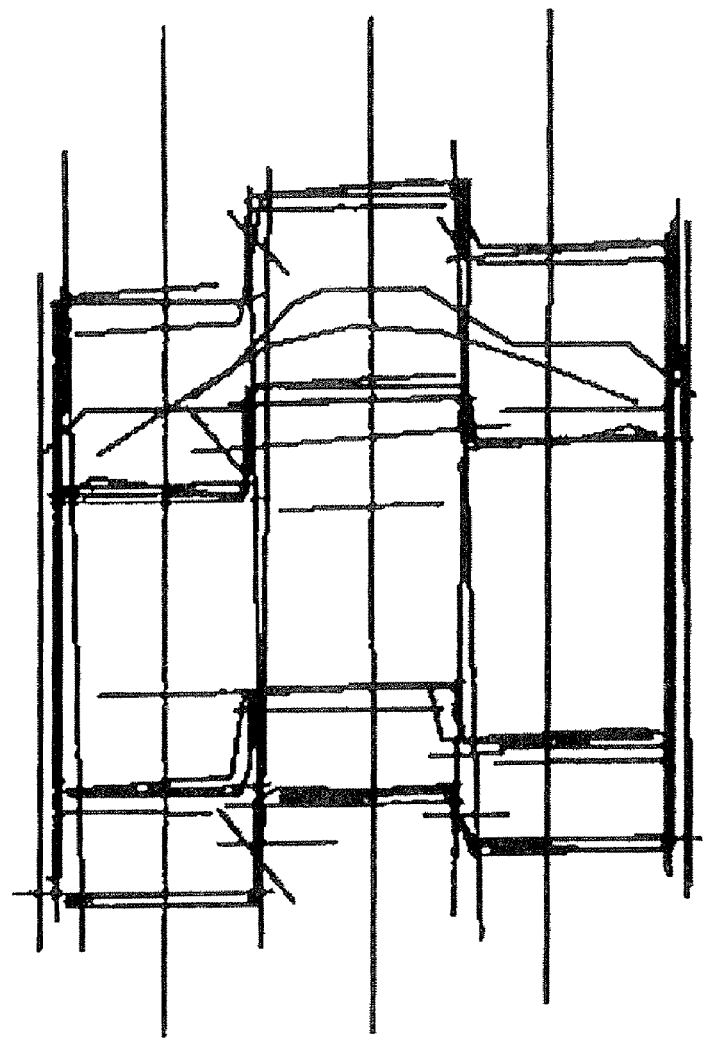
FIGS. 12a to 12d show, respectively, a plan view of overlying geological line spatial features, the spatial features dilated to represent predicted errors, a map of the geological line spatial features including representation of a degree of correlation between the features, and an overlay of the correlation map with the modelled subterranean body from which they were generated.
Figure 12B:
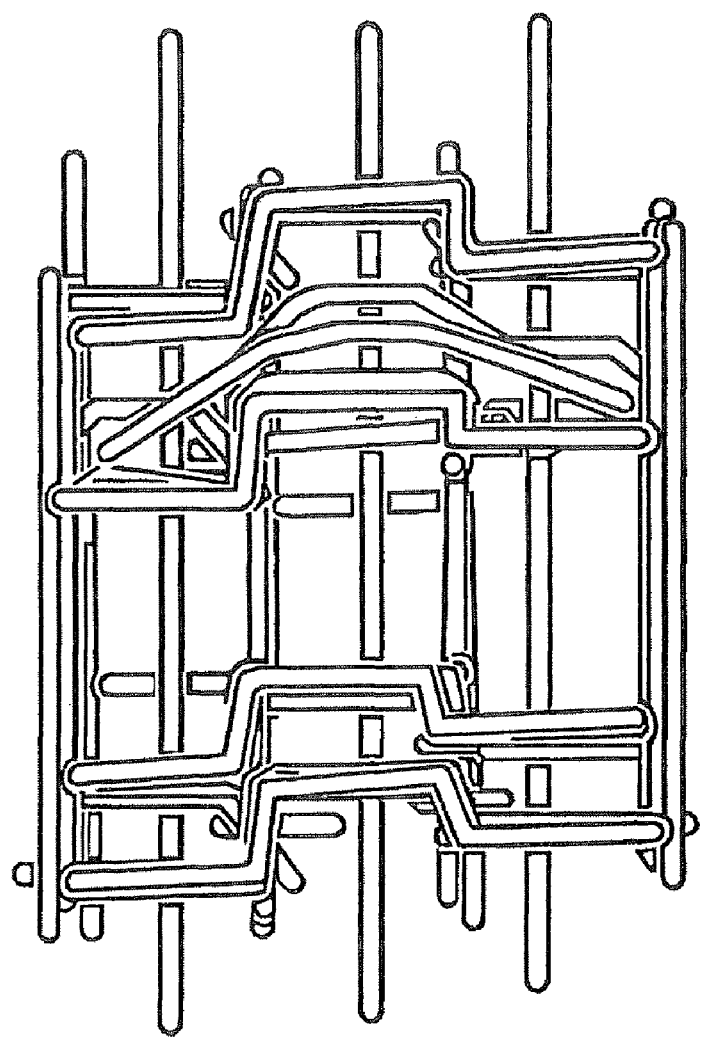
Figure 12C:
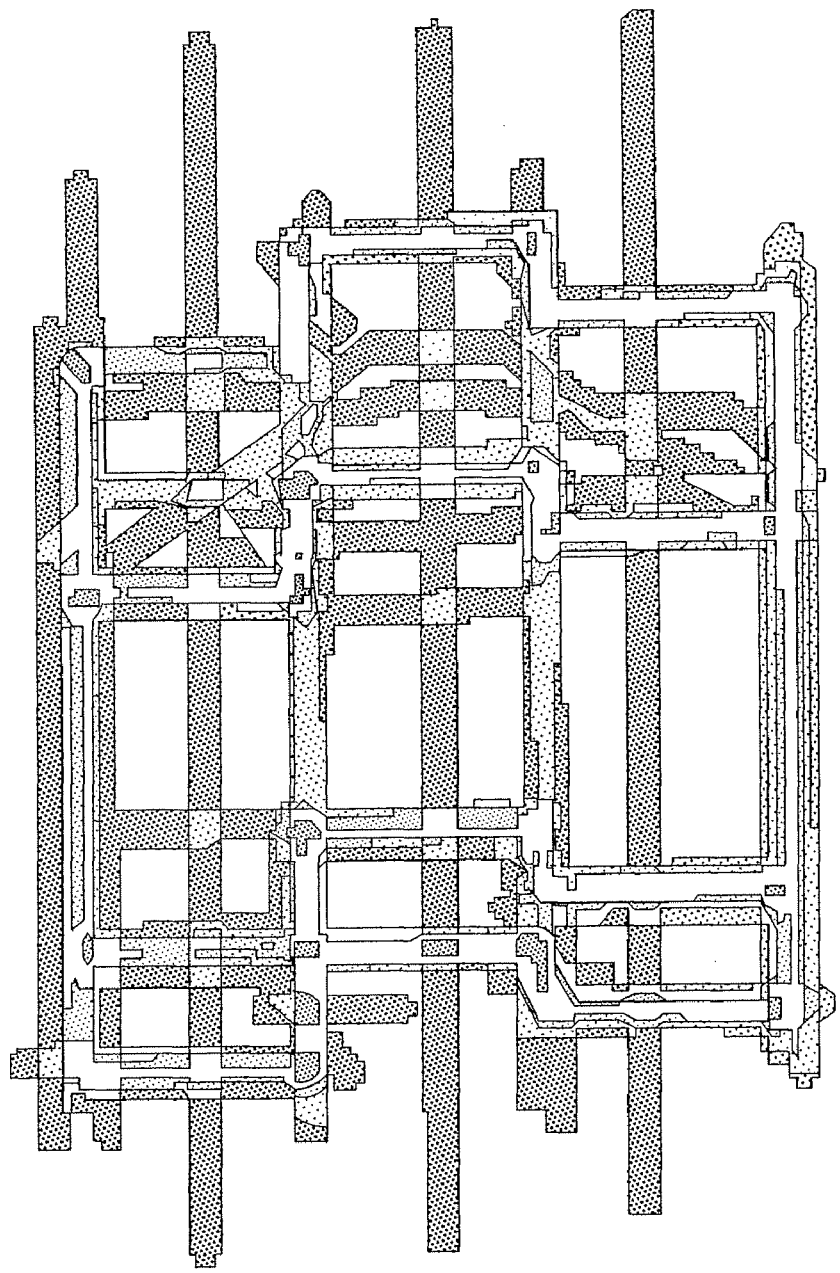
Figure 12D:
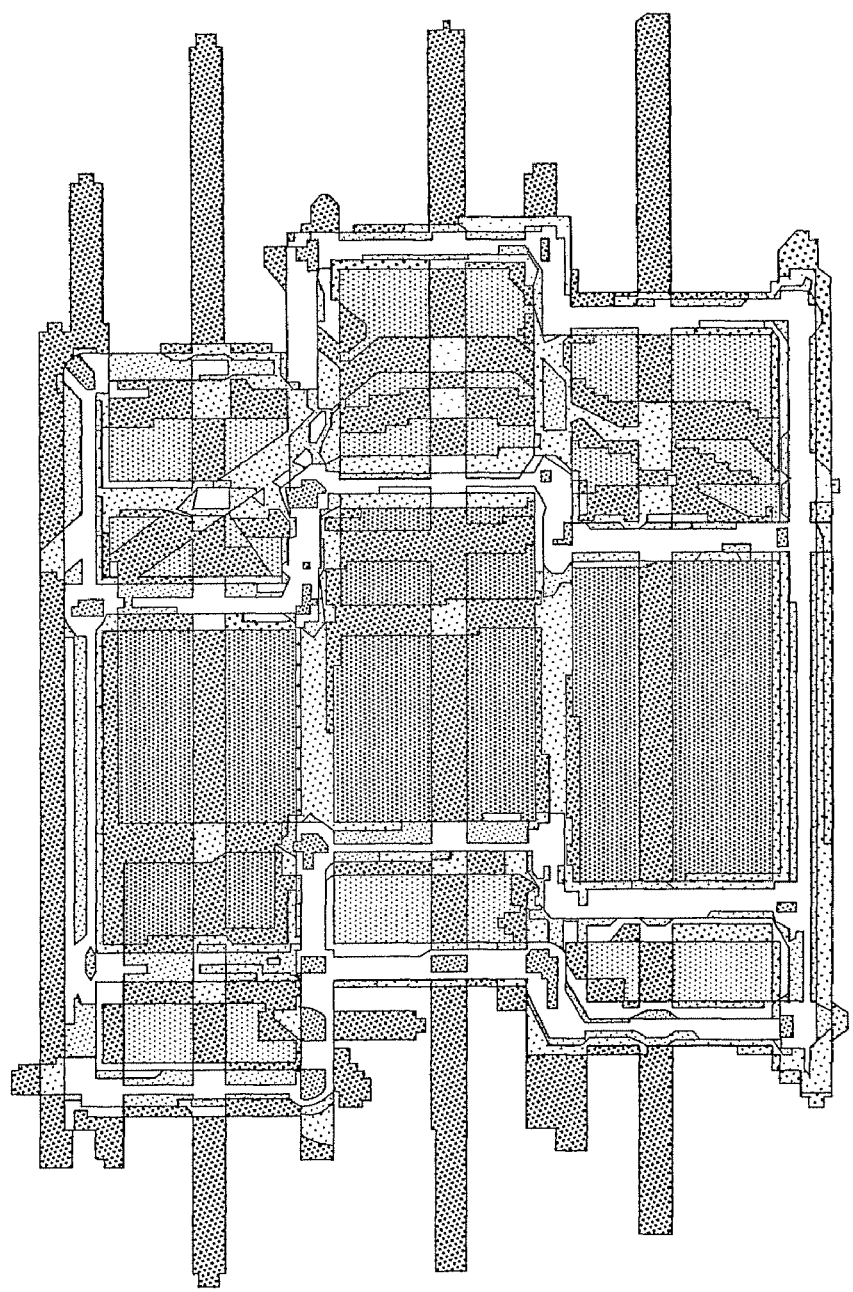

The identified point/line spatial features denote locations of geological change, for example structural or stratigraphical change. FIG. 12a shows that some value can be obtained from a simple superposition or overlay in plan view of the geological lines of interpretation, even when these are not dilated to account for errors but FIG. 12b shows that when these lines are dilated or "buffered" the representation is less clear. FIG. 12c shows a plot representing a degree of coherency determined by counting overlapping lines as described above. FIG. 12d shows the coherency plot superposed on a plan or map view of the modelled subterranean body shown in FIG. 3d, illustrating that this representation provides an accurate depiction of the underlying geology, the warmest colours (red and orange) picking our the corners of the body and the tepid colours (yellow and light green) identifying the edges of the body.

Although the plot data represents the degree of correlation on a set of lines representing the identified spatial features ("ribbon coherency plot") need not be displayed explicitly but may be further processed to represent the degree of coherence as a graduated (for example colourised) or contoured surface over the surveyed region. Thus at step 212 although the procedure may output a ribbon coherency plot, in embodiments areas of the (2D) map which contain high concentrations of warm colours may be demarcated with a frame such as a box denoting an area of interest. In embodiments, depending on the concentration of the warm colours, the boxed or framed areas are divided into primary and secondary areas of interest. With such a representation it can be helpful to also provide a coherency surface, that is a surface which is contoured according to the determined degree of correlational coherency between the identified spatial features. In still other embodiments the degree of coherency may be represented on a grid, either as contours or warm/cool colours.

Figure 13:
FIG. 13 illustrates geological line spatial features including a representation of a degree of correlation/coherency for a real example of a surveyed region.

FIG. 13 shows an example ribbon coherency plot derived from real geological data. As can be seen a result of processing as described above comprises a set of connected ribbons of tepid/warm colours defining lines on a plan view of the survey region indicating locations of geological change. In embodiments the procedure may use this data to determine and display a fault polygon mesh (step 214 in the procedure of FIG. 2) by constructing polygons over complete or almost-complete loops formed by the ribbons of coherency. These are useful in demarking regions avoid when drilling for exploration (because the underlying geology varies either side of a fault, hence drilling does not clearly sample a particular geological region).

The procedure of FIG. 2 may be embodied as computer program code on a carrier 250. In embodiments the steps in the procedure of FIG. 2 may be implemented using any one of a range of conventional geographic information system (GIS) tools well known to those skilled in the art. In embodiments the processes to generate point/line spatial features may involve interaction with a skilled user in order to take account of human expertise. Some techniques which have been found to be particularly useful for identifying point/line spatial features, in addition to those described above, are: for $G_{xy}$, treating the data as representing fluid levels and allowing these levels to flow, identifying the flow direction and allowing flows to accumulate detect edges (using watershed software); and for $G_{xx}$, $G_{yy}$, $G_2$ determining eigenvalues.

We now describe a technique, related to the above-described processing, for determining a three-dimensional representation of the underlying geology of a surveyed region. Broadly speaking embodiments of the technique determine a degree of correlation/coherency between spatial features at different targeted depths to trace the underlying geology and, in particular, provide a representation of corner/edges, surfaces between regions of different geological composition. Thus, in embodiments, the potential field data is filtered by wavelengths to generate a set of quasi two-dimensional maps (2.5 d maps), preferably at least 10 maps, for example between 50 and 100 maps, one per filtered wavelength. The maps are "2½ dimensional" because a map derived by filtering by wavelength itself has a limited range of depth information and is therefore not "flat".

Figure 14:
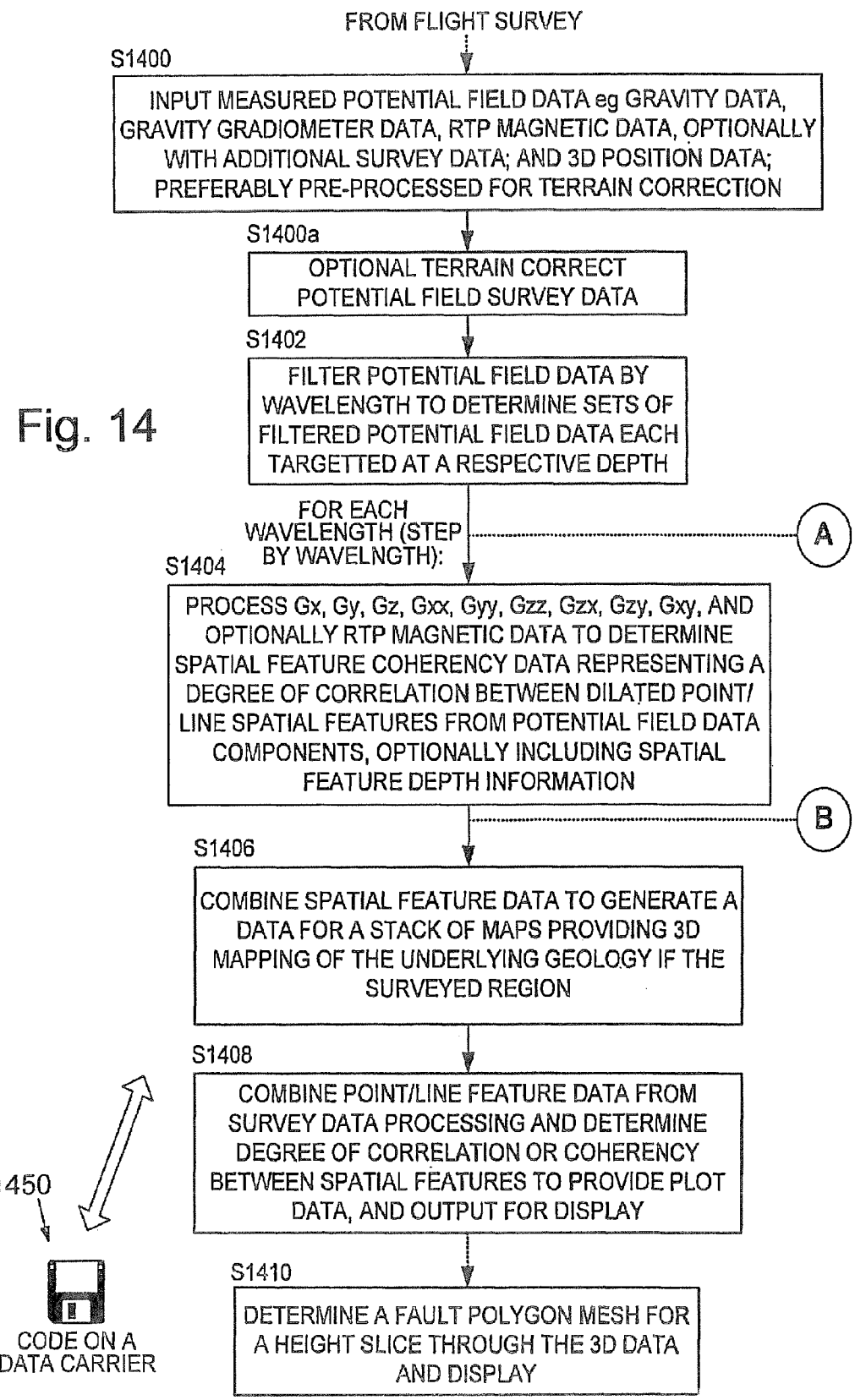
FIG. 14 illustrates a procedure for generating a three-dimensional representation of the underlying geology of a surveyed region according to an embodiment of the aspect of the invention.

Thus referring to FIG. 14, at step 1400 the procedure inputs potential field data with associated 3D measurement position data, preferably pre-processed for terrain correction (although this may alternatively be implemented in the procedure as illustrated in step 1400a). Then at step 1402 this potential field data is filtered by wavelength (step 1402) to determine a plurality of sets of filtered potential field data, for example between 50 and 100 sets of filtered data, each targeted at a respective depth.

Each set of wavelengths/filtered data is then processed according to the procedure of FIG. 2 between points A and B to determine plot data representing a degree of correlation/coherency between the identified spatial features and the respective target depths for the filtered wavelength or wavelength band (step 1404). (As described previously other survey data may also be included in the correlation, for example hyperspectral imagery, soil survey data and the like).

The procedure then combines the spatial feature data from the different filtered wavelengths (step 1406) to generate data for a stack of 2.5D maps, each comprising a ribbon coherency plot as described above, but preferably with associated depth information for the identified point/line spatial features and hence correlations. This information may be further combined (step 1408) to determine correlation/coherency between maps of different levels. The skilled person will understand that correlation between identified spatial features may be performed prior to generating the stack of 2/2.5D maps or, alternatively, the degree of correlation/coherency between the identified spatial features may be performed in three dimensions without any intermediate step of generating correlations in 2/2.5D. Once the 3D data has been generated the 3D map of the underlying geology may be represented using any of a range of commercially available visualisation tools, for example.

An arbitrary surface or horizon may be defined in this three-dimensional data (this surface may be an approximation to the topographic surface of the earth) and then a fault polygon mesh defined on this surface, as described above (step 1410). However because three-dimensional data is available this concept may be extended to define fault surfaces and/or three-dimensional fault polygons representing the three-dimensional surface of a fault beneath the surveyed region. This may be performed, for example, by translating the height (depth) of a plane through the 3D region and constructing a 2D polygon mesh on each surface, the height (depth) translated edges of the 2D polygons defining surfaces of 3D fault polygons.

The procedure of FIG. 14 is preferably implemented using computer program code on a carrier such as carrier 1450. Again this code may be implemented using commercially available geographic information system code as previously described. In embodiments the software may also provide for expert user interaction to identify/modify spatial features for the above-described procedure.

Figure 15A:
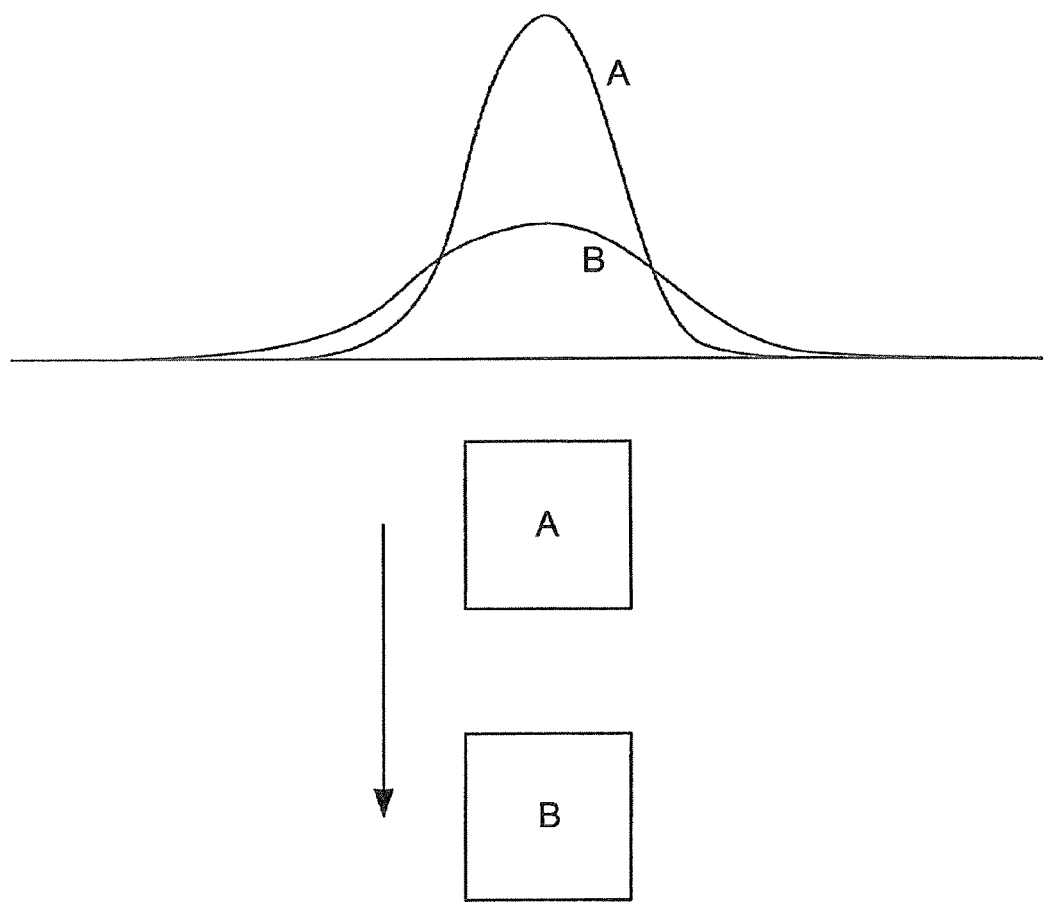
FIGS. 15a and 15b illustrate, schematically, changes in measured potential field data with a depth of a geological feature.
Figure 15B:
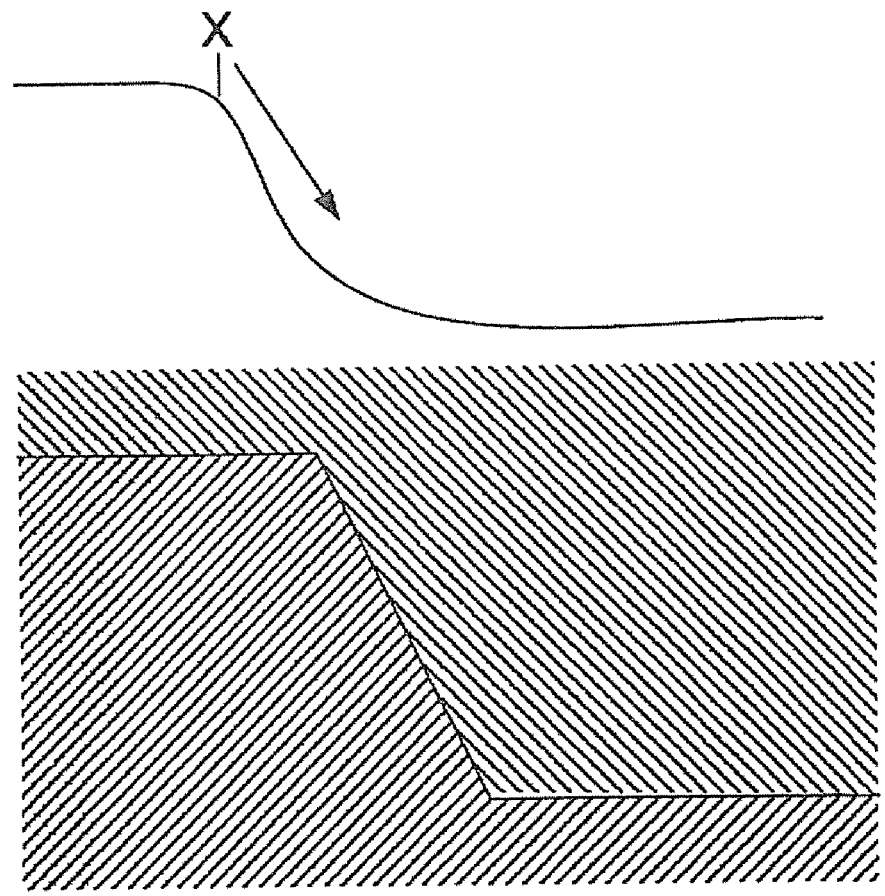

FIG. 15*a* illustrates, schematically, the change in amplitude and spatial frequency of a measured potential field (gravity gradient) signal with increasing depth of a geological feature from A to B. The precise shape of the measured potential field depends upon the shape of the underlying geology although a constraint on maximum depth may also be applied, whatever the shape of the geological feature. As the skilled person will be aware, there are several different algorithms which may be employed to estimate the depth of a geological feature based upon the measured potential field (and vice versa). FIG. 15*b* illustrates the operation of the wavelength filtering of the procedure of FIG. 14, showing a fault and a point of inflection marked X. As the potential field data (e.g. gravity gradient) is filtered to remove shorter wavelengths the inflection point moves in the direction of the arrow (and the amplitude drops), tracking the fault downwards (the error also increases and optionally, the dilation of the identified spatial features may also be increased with increasing targeted depths to take account of this).

It can be seen, from FIG. 15*b*, that filtering by wavelength can target different geological depths, and from FIG. 15*a* that for a given targeted depth, depth information for an identified spatial feature more precisely specifying the depth of the feature is available. The combination of these two types of information is particularly advantageous for identifying fault polygons in three dimensions since, for example, for the fault illustrated in FIG. 15*b*, both the top and bottom edges of the fault may be identified and the fault's shape in three dimensions may be ascertained.

The skilled person will appreciate that embodiments of the technique we describe are useful in identifying geological features of potential oil/mineral value, and can also be employed to trace one or more fault planes in 2D or 3D space, which is particularly helpful for exploratory drilling.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A computer-implemented method of processing geophysical data including at least measured potential field data from a potential field survey of a surveyed region of the earth to provide a three-dimensional representation of the underlying geology of said surveyed region, the method being implemented by a computer comprising a memory in communication with a processor, the method comprising:

inputting, to said processor, terrain-corrected potential field data for said surveyed region, said potential field data comprising data for a range of spatial wavelengths, geological features at different depths in said surveyed region being associated with different wavelengths in said range of wavelengths;

filtering, by said processor, said potential field data by spatial wavelength to generate a first plurality of filtered sets of potential field data, each relating to a respective wavelength or range of wavelengths, each targeting geological features at a different respective said depth;

processing, by said processor, each said filtered set of potential field data, to identify a set of spatial features comprising one or both of line spatial features and point spatial features in each said filtered set of potential field data, and to generate a set of plot data for each said filtered set of potential field data, a said set of plot data representing said identified set of spatial features for a said depth targeted by said filtering; and combining, by said processor, said sets of plot data to generate three-dimensional map data providing a three-dimensional representation of said underlying geology of said surveyed region.

2. A method as claimed in claim 1 wherein said processing to identify spatial features comprises processing, by said processor, to identify one or more of maxima, minima, and lines of inflection in said filtered potential field data.

3. A method as claimed in claim 1 wherein said processing to generate a said set of plot data includes processing, by said processor, to provide estimated depth data for said identified spatial features.

4. A method as claimed in claim 1 wherein said processing to generate a said set of plot data further comprises dilating, by said processor, said spatial features to represent an error in said potential field data.

5. A method as claimed in claim 1 wherein said processing to generate a said set of plot data further comprises determining, by said processor, a degree of correlation between said identified set of spatial features and a second set of spatial features derived from said geophysical data, and wherein said three-dimensional representation of said underlying geology further represents said degree of correlation.

6. A method as claimed in claim 5 wherein said potential field data comprises vector or tensor potential field data, wherein said processing to identify a set of spatial features comprises processing, by said processor, a first vector or tensor component of said potential field data, and wherein the method further comprises processing a second vector or tensor component of said potential field data to identify said second set of spatial features, said second set of spatial features comprising one or both of line and point spatial features.

7. A method as claimed in claim 6 further comprising filtering said second vector or tensor component of said potential field data by spatial wavelength to generate a second plurality of filtered sets of potential field data, each relating a corresponding respective wavelength or range of wavelengths to a wavelength or range of wavelengths of said first plurality of filtered sets of potential field data, wherein said processing of said second vector or tensor component to identify said second set of spatial features comprises processing, by said processor, each of said second plurality of filtered sets of potential field data to identify a said second set of spatial features, and wherein said determining of said degree of correlation comprises determining a degree of correlation between sets of spatial features identified from said first and second vector or tensor component of said potential field data for corresponding wavelengths or ranges of wavelengths, whereby said correlation is between spatial features relating to targeted geological features at corresponding depths.

8. A method as claimed in claim 5 wherein said second set of spatial features includes one or both of point and line spatial features derived from a second set of survey data for said surveyed region additional to said potential field data.

9. A method as claimed in claim 1 wherein said potential field data comprises gravity gradiometer data, wherein said spatial features comprise line spatial features, and wherein said processing to identify said spatial features comprises determining lines of inflection in on-diagonal tensor components of said gravity gradiometer data.

10. A method as claimed in claim 1 further comprising generating, by said processor, from said plot data, fault polygon data representing a location of one or more geological faults on a surface of said surveyed region.

11. A method of extracting oil or a mineral from the earth, the method comprising conducting a potential field survey of a region, using the method of claim 1 to process data from said potential field survey to generate a said three-dimensional representation of the underlying geology of the surveyed region, and extracting said oil or mineral using said three-dimensional representation of said underlying geology.

12. A method as claimed in claim 1 further comprising filtering said potential field data by spatial wavelength to target geological features at a depth or range of depths selected by said filtering prior to said processing of said potential field data to identify said spatial features.

13. A carrier having a processor control code thereon that causes said processor to implement the method of claim 1.

14. A computer-implemented method of processing geophysical data including at least measured potential field data from a potential field survey of a surveyed region of the earth to provide a representation of the underlying geology of the surveyed region as a set of lines, the method being implemented by a computer comprising a memory in communication with a processor, the comprising:
  inputting, to said processor, potential field data for said surveyed region;
  processing, by said processor, said potential field data to identify spatial features comprising one or both of line spatial features and point spatial features, said spatial features corresponding to locations of changes in said underlying geology;
  determining, by said processor, a degree of correlation between said identified spatial features; and
  generating, by said processor, plot data providing a representation of said degree of correlation on a set of lines representing said line spatial features to identify said locations of said changes to thereby represent said underlying geology of said surveyed region.

15. A method as claimed in claim 14 wherein said processing to identify spatial features comprises processing, by said processor, to identify one or more of maxim, minima and lines of inflection in said potential field data.

16. A method as claimed in claim 14 wherein said identifying of said spatial features comprises identifying, by said processor, sets of respective spatial features from different respective vector or tensor components of said potential field data, and wherein said determining of said degree of correlation comprises determining, by said processor, a degree of correlation between said sets of identified spatial features identified from said different respective vector or tensor components of said potential field data.

17. A method as claimed in claim 14 wherein said generating of said plot data further comprises dilating, by said processor, said spatial features to represent an error in said potential field data.

18. A method of extracting oil or a mineral from the earth, the method comprising conducting a potential field survey of a region, using the method of claim 14 to process data from said potential field survey to generate a said representation of said degree of correlation to thereby represent said underlying geology of said surveyed region, and extracting said oil or mineral using said representation.

19. A computer-implemented method of processing geophysical data including at least measured potential field data from a potential field survey of a surveyed region of the earth to provide a three-dimensional representation of the underlying geology of said surveyed region, the method being implemented by a computer comprising a memory in communication with a processor, the method comprising:
  inputting, to said processor, geological spatial feature data derived from filtered potential field data, said filtered potential field data comprising data filtered by spatial wavelength to generate a plurality of filtered sets of potential field data each targeting geological features at a different respective depth in said surveyed region, said spatial feature data comprising data identifying a set of spatial features for each said targeted depth, a said set of spatial features comprising one or both of line spatial features and point spatial features; and
  combining, by said processor, said sets of spatial features for each said targeted depth to generate three-dimensional map data providing a three-dimensional representation of said underlying geology of said surveyed region.

20. A method as claimed in claim 19 further comprising determining, by said processor, a degree of correlation between said spatial features to generate said three-dimensional map data.

21. A method as claimed in claim 19 wherein said spatial features comprise spatial features from different respective vector or tensor components of said potential field data.

22. A method of extracting oil or a mineral from the earth, the method comprising conducting a potential field survey of a region, using the method claim 19 to process data from said potential field survey to generate a said three-dimensional (3D) representation of the underlying geology of the surveyed region, and extracting said oil or mineral using said 3D representation of said underlying geology.

23. A geological data processing system for processing geophysical data including at least measured potential field data from a potential field survey of a surveyed region of the earth to provide a representation of the underlying geology of said surveyed region, the system comprising:

an input system for receiving said measured potential field data; and a processor coupled to said input system, said processor configured to:

filter said potential field data by spatial wavelength to generate a first plurality of filtered sets of potential field data wherein each filtered set relates to a respective wavelength or range of wavelengths and wherein each filtered set targets geological features at a different respective said depth;

process each said filtered set of potential field data;

identify a set of spatial features comprising one or both of line spatial features and point spatial features in each said filtered set of potential field data;

generate a set of plot for each said filtered set of potential field data, a said set of plot data representing said identified set of spatial features for a said depth targeted by said filtering; and combine said sets of plot data to generate three-dimensional map data providing a three-dimensional representation said underlying geological features of said surveyed region.

* * * * *

UNITED STATES PATENT AND TRADEMARK OFFICE
CERTIFICATE OF CORRECTION

PATENT NO.        : 8,386,180 B2                                      Page 1 of 1
APPLICATION NO.   : 12/452986
DATED             : February 26, 2013
INVENTOR(S)       : Mark Davies It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 451 days.

Signed and Sealed this

First Day of September, 2015

Michelle K. Lee
*Director of the United States Patent and Trademark Office*